(12) United States Patent
Ding

(10) Patent No.: US 9,539,597 B2
(45) Date of Patent: Jan. 10, 2017

(54) PRESS-TYPE LIQUID PUMP

(71) Applicant: Yaowu Ding, Taixing (CN)

(72) Inventor: Yaowu Ding, Taixing (CN)

( * ) Notice: Subject to any disclaimer, the term of this patent is extended or adjusted under 35 U.S.C. 154(b) by 0 days.

(21) Appl. No.: 14/401,432

(22) PCT Filed: Dec. 28, 2012

(86) PCT No.: PCT/CN2012/087767
§ 371 (c)(1),
(2) Date: Nov. 14, 2014

(87) PCT Pub. No.: WO2013/170614
PCT Pub. Date: Nov. 21, 2013

(65) Prior Publication Data
US 2015/0136810 A1   May 21, 2015

(30) Foreign Application Priority Data
May 16, 2012   (CN) .......................... 2012 1 0153101

(51) Int. Cl.
*B05B 11/00*   (2006.01)
(52) U.S. Cl.
CPC ........ *B05B 11/3001* (2013.01); *B05B 11/0027* (2013.01); *B05B 11/3002* (2013.01);
(Continued)
(58) Field of Classification Search
CPC ............. B05B 11/0027; B05B 11/3001; B05B 11/3002; B05B 11/3004; B05B 11/3023; B05B 11/3035; B05B 11/3042; B05B 11/3047; B05B 11/305; B05B 11/306; B05B 11/3073; B05B 11/3074; B05B 11/3076; B05B 11/3077
See application file for complete search history.

(56) References Cited

U.S. PATENT DOCUMENTS 3,452,905 A * 7/1969 Micallef ............. B05B 11/3028
                                                      222/207
4,347,953 A * 9/1982 Bauer ..................... B05B 1/083
                                                      222/207
(Continued)

FOREIGN PATENT DOCUMENTS

CN          201102700 Y     8/2008
CN          202591008 U     12/2012
(Continued)

OTHER PUBLICATIONS

English Translation of Chinese Official Action dated Dec. 15, 2014, for Chinese Serial No: 201210153101.3 and Chinese language Chinese Office Action, consisting of 11 pages.
(Continued)

*Primary Examiner* — Frederick C Nicolas
*Assistant Examiner* — Bob Zadeh
(74) *Attorney, Agent, or Firm* — Christopher & Weisberg, P.A.

(57) ABSTRACT

The present invention relates to a press-type liquid pump. The liquid pump comprises a fixed unit fixed relative to a container and a movable unit capable of performing a reciprocating motion relative to the fixed unit, and a liquid product is pumped to the exterior of the container. The reciprocating motion is achieved by a pressing force applied by a user to the movable unit to move the movable unit relative to the fixed unit in combination with an elastic restoring means for restoring the movable unit relative to the fixed unit after the pressing force is removed. The elastic restoring means is a plastic elastic compressing means located below a toothed sleeve and installed between the fixed unit and the movable unit, which comprises at least one elastic strip generally formed in an arc shape.

21 Claims, 32 Drawing Sheets

(52) U.S. Cl.
CPC ........ *B05B 11/3004* (2013.01); *B05B 11/305* (2013.01); *B05B 11/306* (2013.01); *B05B 11/3023* (2013.01); *B05B 11/3035* (2013.01); *B05B 11/3042* (2013.01); *B05B 11/3047* (2013.01); *B05B 11/3073* (2013.01); *B05B 11/3074* (2013.01); *B05B 11/3076* (2013.01); *B05B 11/3077* (2013.01)

(56) References Cited

U.S. PATENT DOCUMENTS

| | | | | |
|---|---|---|---|---|
| 5,013,303 | A * | 5/1991 | Tamari | A61M 5/1483 128/DIG. 12 |
| 5,462,208 | A * | 10/1995 | Stahley | B05B 7/0037 222/190 |
| 5,518,377 | A * | 5/1996 | Bougamont | B05B 11/007 222/321.3 |
| 5,794,821 | A * | 8/1998 | Foster | B05B 11/007 222/153.13 |
| 6,109,479 | A * | 8/2000 | Ruckdeschel | A61M 15/0065 222/153.14 |
| 6,223,954 | B1 | 5/2001 | Carow | |
| 6,805,267 | B2 * | 10/2004 | Bougamont | B05B 11/0064 222/207 |
| 6,871,798 | B2 * | 3/2005 | Mathiez | A45D 34/02 239/302 |
| 7,036,691 | B2 * | 5/2006 | Nicolas | B65D 83/206 222/153.11 |
| 2004/0055457 | A1 * | 3/2004 | Masuda | B05B 11/3035 92/13 |
| 2004/0149777 | A1 * | 8/2004 | Santagiuliana | B05B 11/3008 222/190 |
| 2005/0072807 | A1 * | 4/2005 | Hsiao | B05B 11/0032 222/251 |
| 2007/0034648 | A1 * | 2/2007 | Mathiez | A45D 34/02 222/162 |
| 2010/0006604 | A1 * | 1/2010 | Ding | B05B 11/007 222/320 |
| 2010/0230443 | A1 * | 9/2010 | Ding | B05B 11/3001 222/321.9 |
| 2010/0301070 | A1 * | 12/2010 | Allef | A47K 5/1208 222/207 |
| 2010/0303582 | A1 * | 12/2010 | Choi | B62D 25/147 411/366.1 |
| 2013/0264359 | A1 * | 10/2013 | Blake | B05B 9/0883 222/336 |
| 2015/0136810 | A1 * | 5/2015 | Ding | B05B 11/3002 222/321.9 |

FOREIGN PATENT DOCUMENTS

| | | |
|---|---|---|
| DE | 000003512649 A1 | 10/1986 |
| DE | 19729516 A1 | 1/1999 |
| EP | 0073918 A1 | 3/1983 |
| EP | 0696480 B1 | 2/1996 |
| EP | 1857186 A1 | 11/2007 |
| FR | 2735452 A1 | 12/1996 |
| JP | 10128176 * | 5/1998 |
| JP | 11292172 A | 10/1999 |
| JP | 2000015148 A | 1/2000 |
| WO | 2006013419 A1 | 2/2006 |

OTHER PUBLICATIONS

English Translation of International Search Report and Chinese Language International Search Report dated Apr. 11, 2013 for International Application No. PCT/CN2012/087767, International Filing Date Dec. 28, 2012 consisting of 8 pages.

Chinese Language Written Opinion of the International Searching Authority dated Apr. 11, 2013 for or International Application No. PCT/CN2012/087767, International Filing Date Dec. 28, 2012 consisting of 5 pages.

* cited by examiner

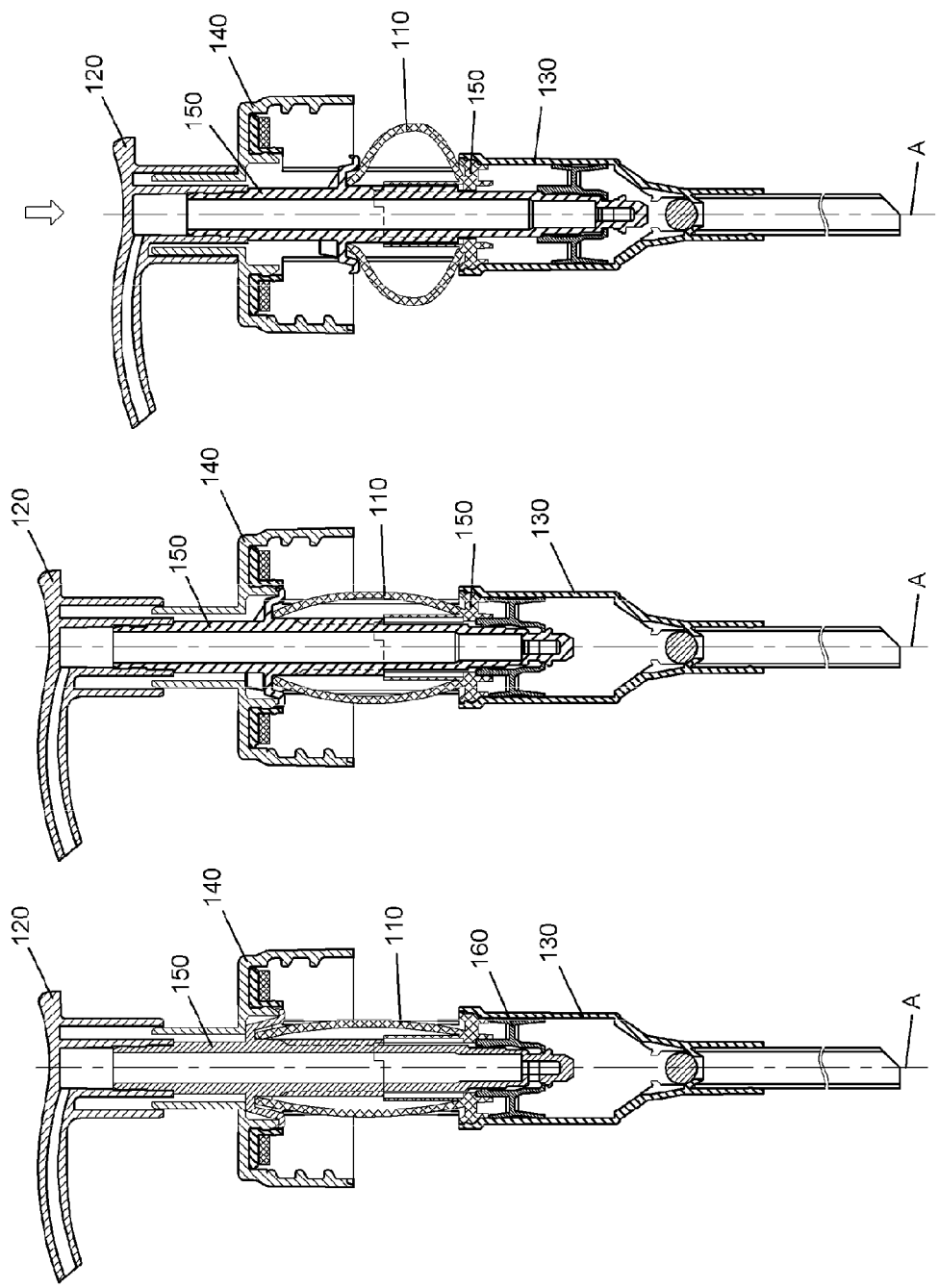

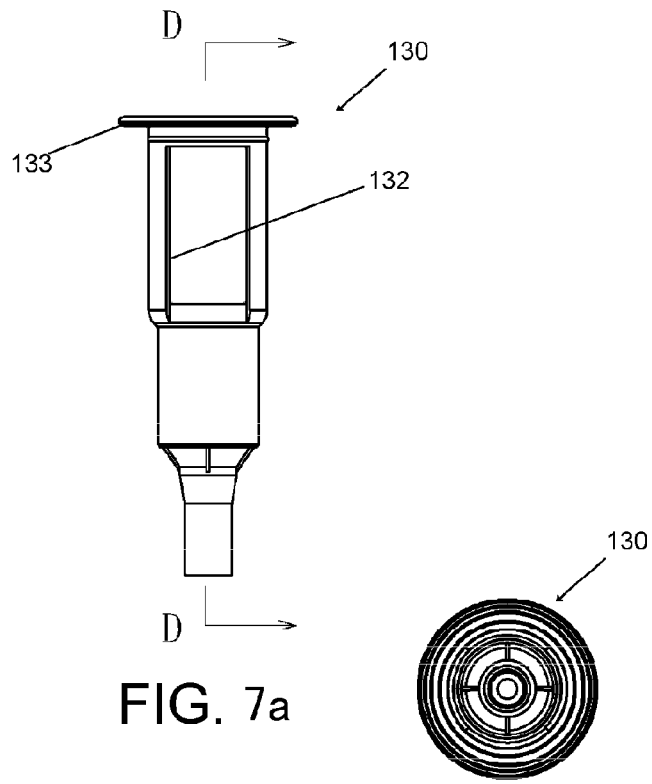
FIG. 7a
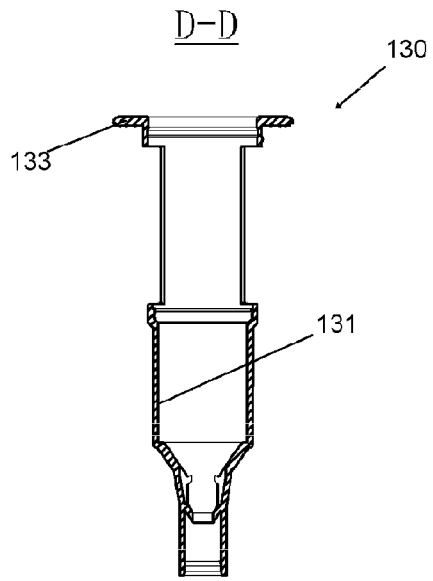
FIG. 7b
FIG. 7c
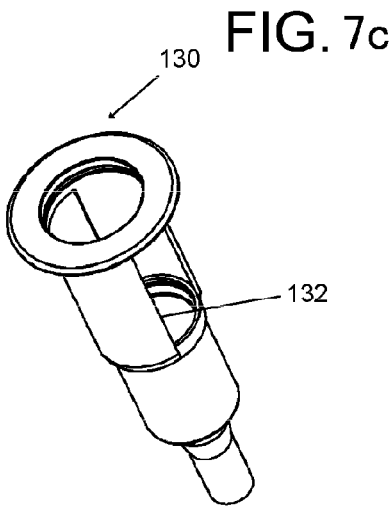
FIG. 7e
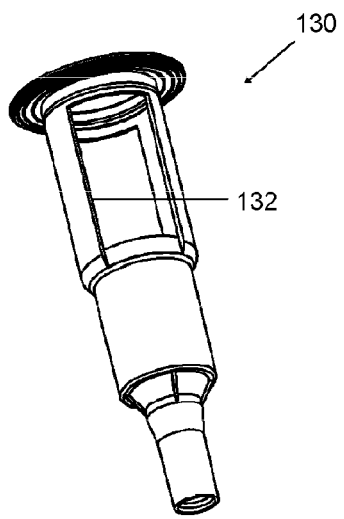
FIG. 7d

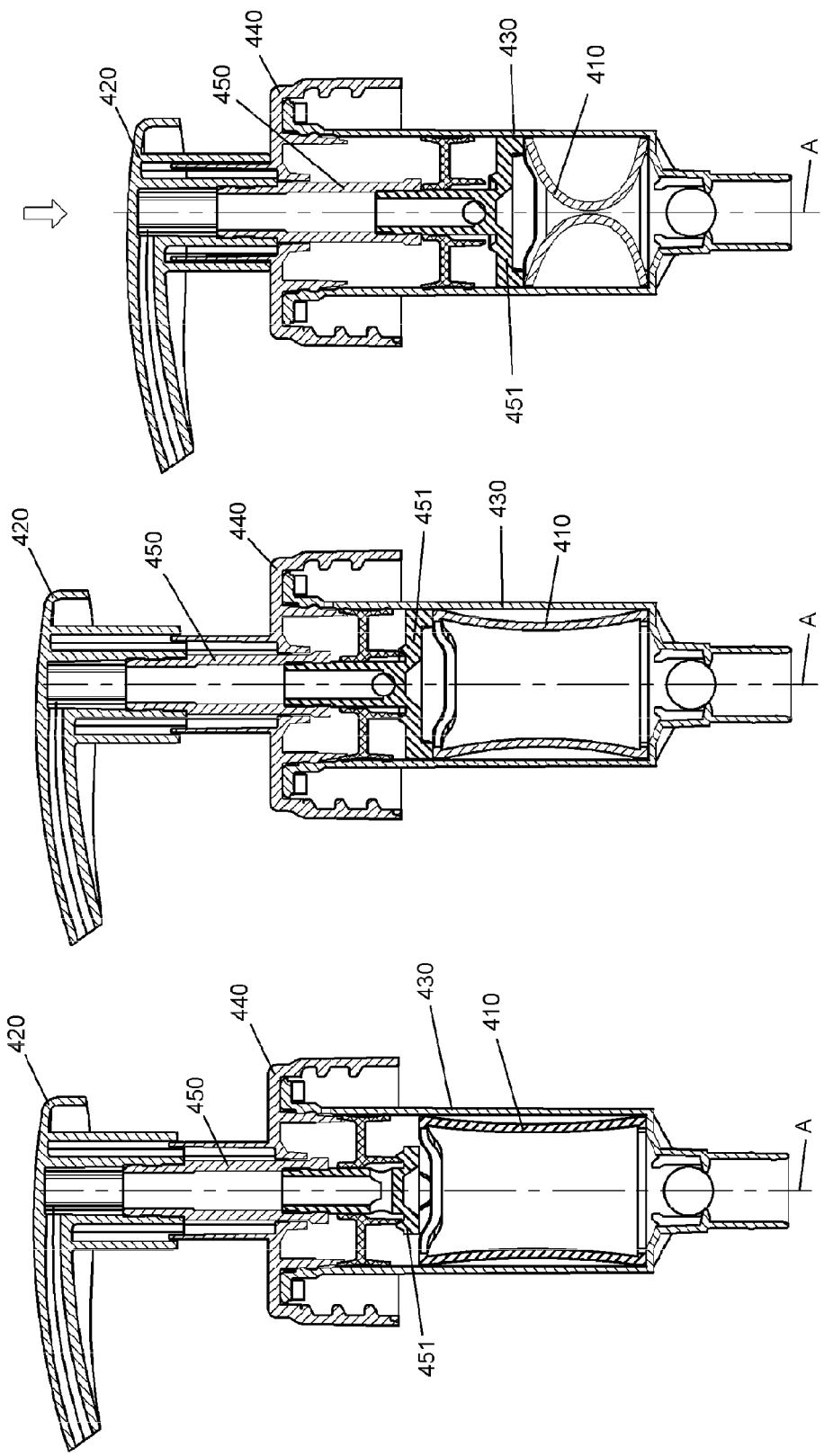

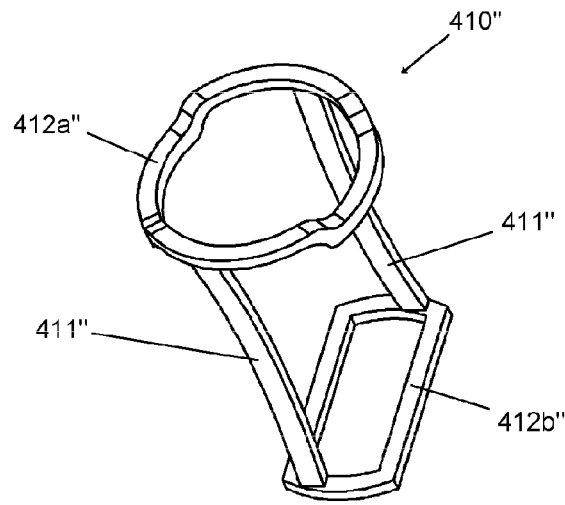
FIG. 24a
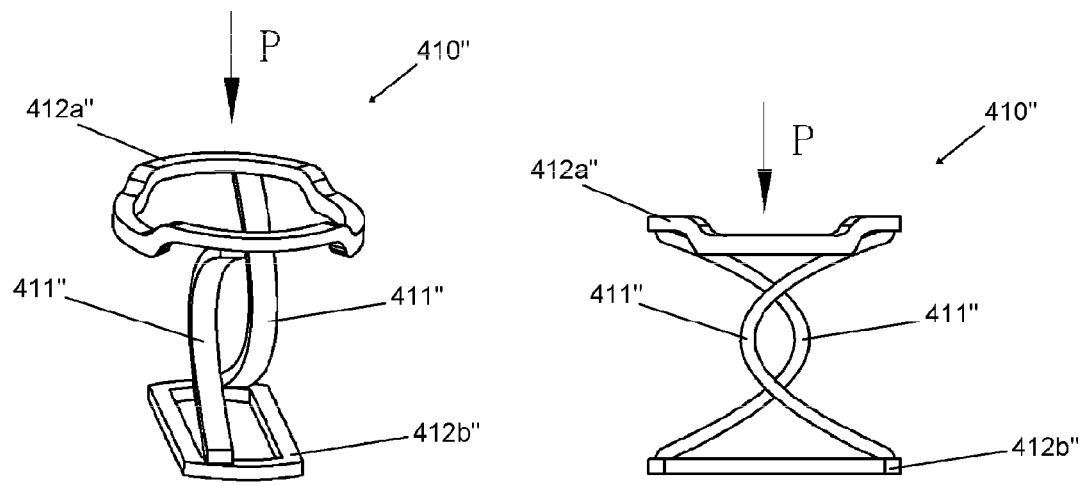
FIG. 24b
FIG. 24c

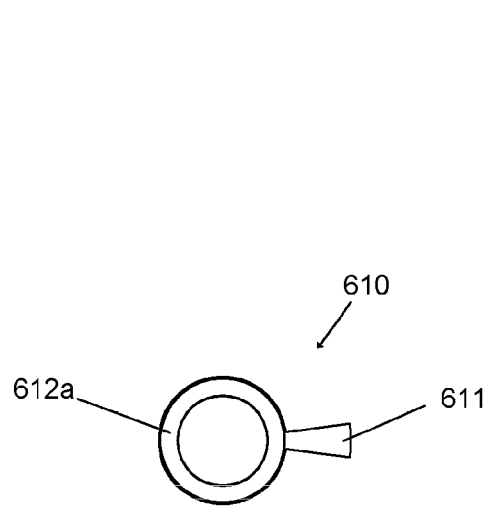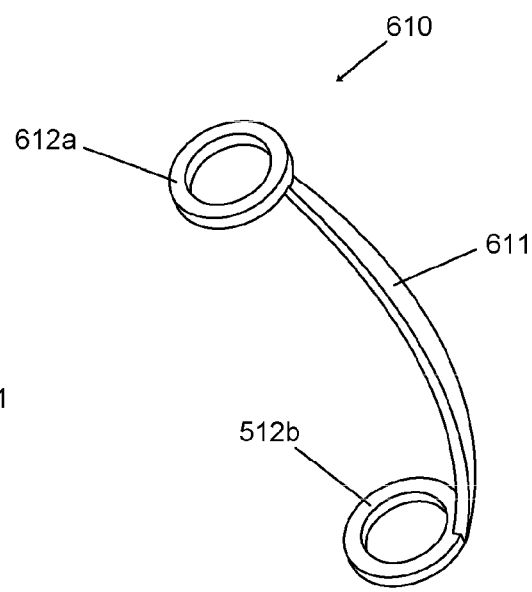
FIG. 30a
FIG. 30b
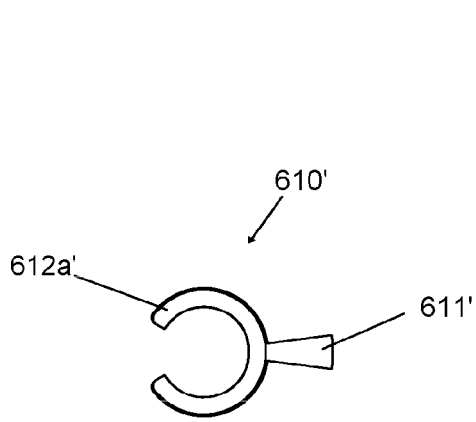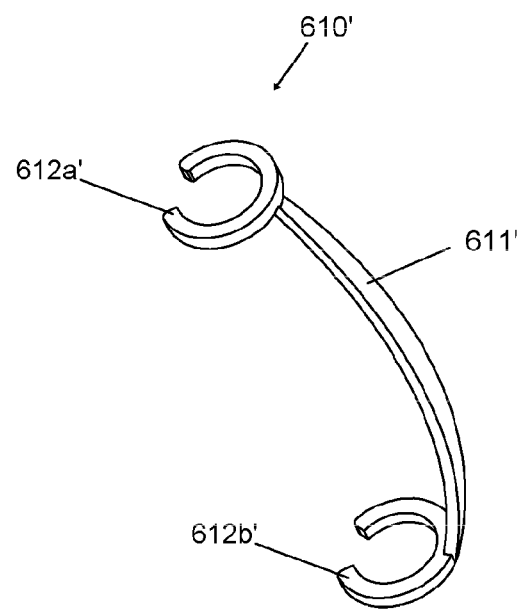
FIG. 31a
FIG. 31b

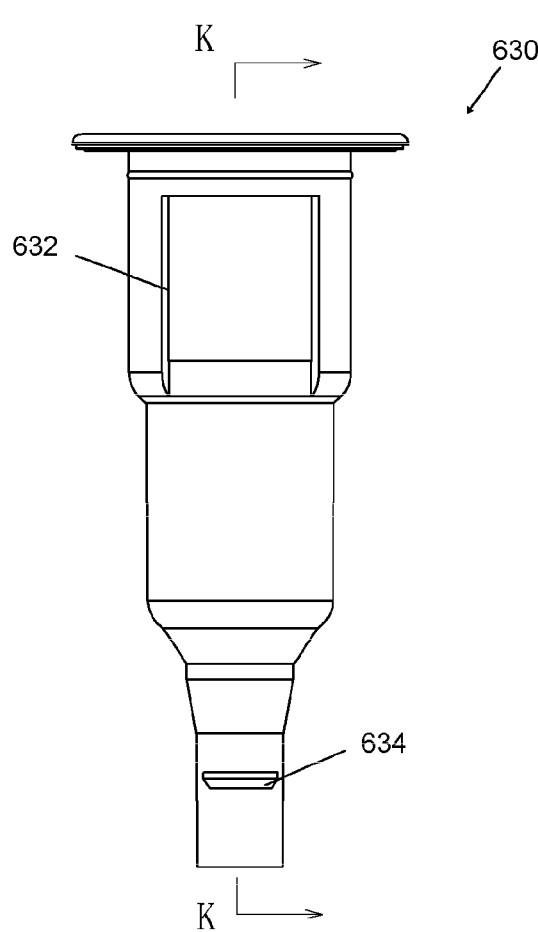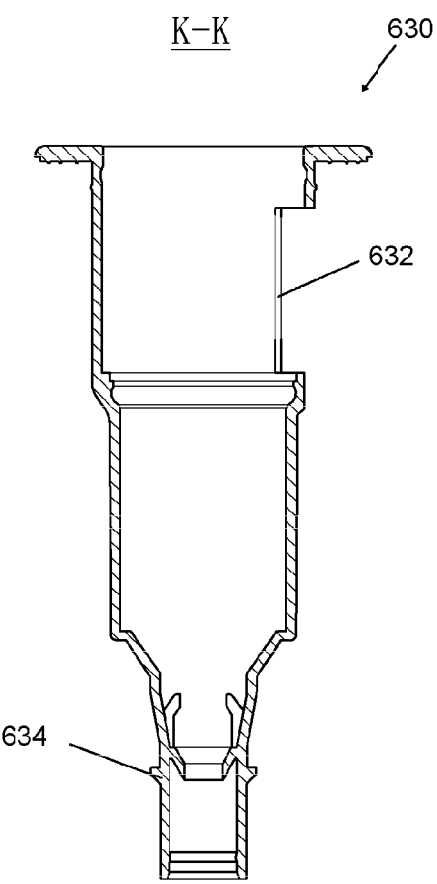
FIG. 32a  FIG. 32b
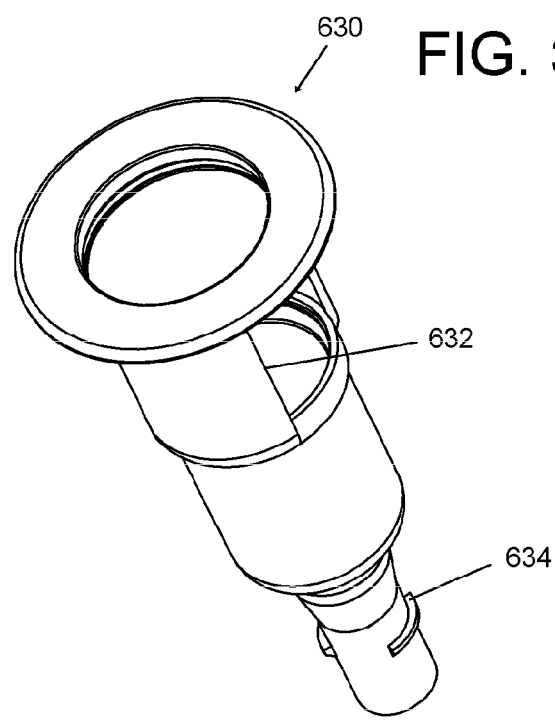
FIG. 32c

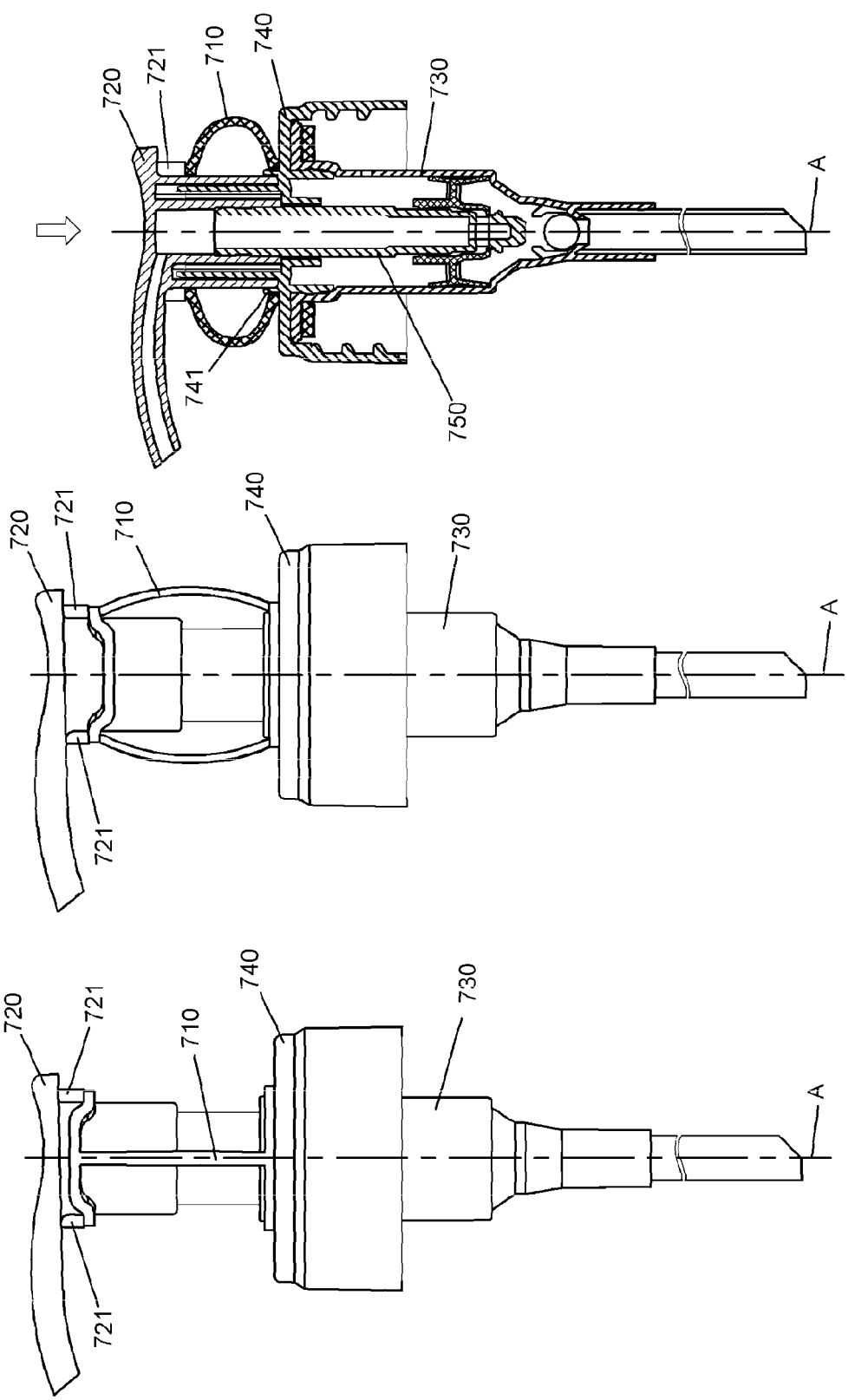

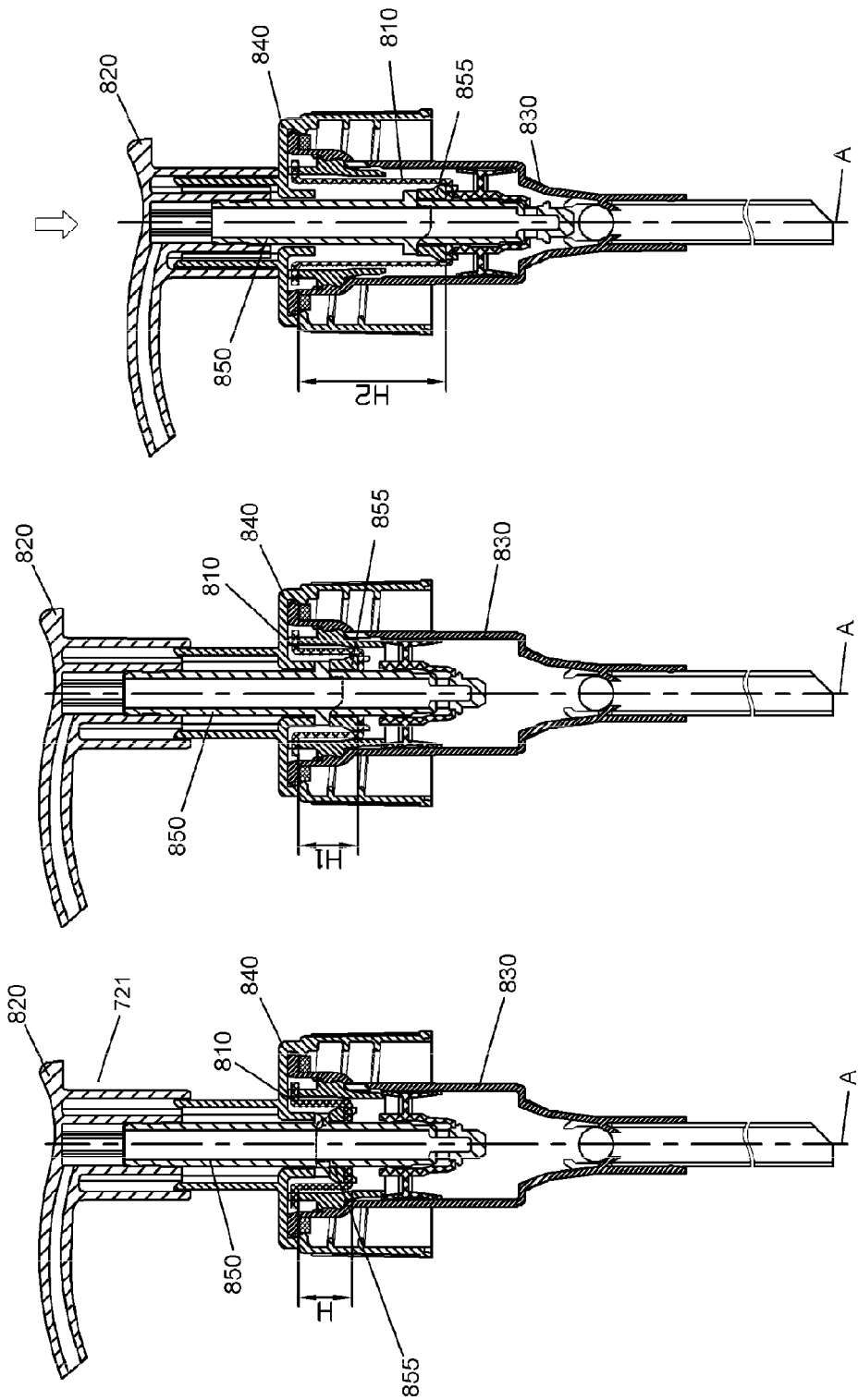

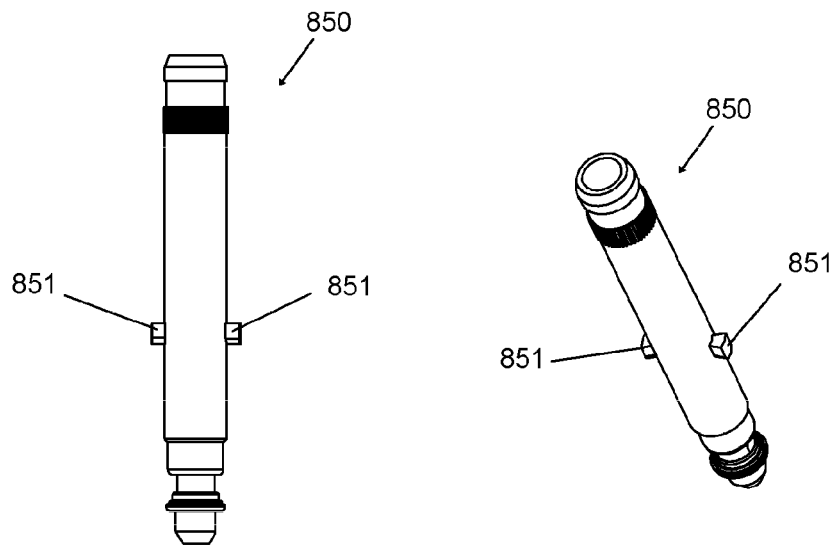
FIG. 40a
FIG. 40b
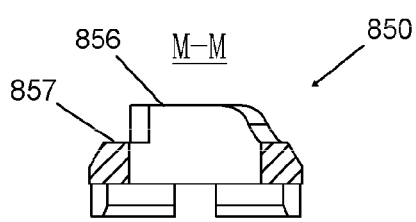
FIG. 41a
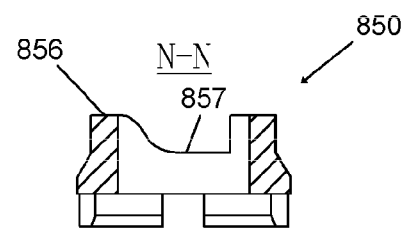
FIG. 41b
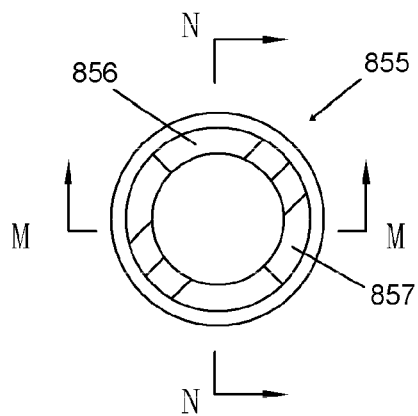
FIG. 41c
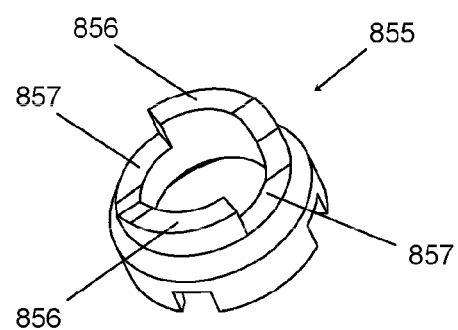
FIG. 41d

PRESS-TYPE LIQUID PUMP

CROSS-REFERENCE TO RELATED APPLICATION

This application is a Submission under 35 U.S.C. 371 for U.S. National Stage Patent of, and claims priority to, International Application Number PCT/CN2012/087767, entitled PRESS-TYPE LIQUID PUMP, filed Dec. 28, 2012, which International Application claims priority to Chinese Application Number CN 201210153101.3, filed May 16, 2012, the entirety of all of which is incorporated herein by reference.

TECHNICAL FIELD

The present invention relates to the field of liquid pumps, and more particularly to a press-type liquid pump.

BACKGROUND ART

A press-type liquid pump is generally installed at an opening of a container, for pumping and dispensing a liquid product in the container to the exterior thereof by means of a manual pressing operation by a user for later use. This liquid pump generally has an elastic restoring means for restoring a pump pressing head to an original position thereof after the user has removed the downward pressing force on the pressing head, and during the restoring of the pressing head, the liquid product within the container is sucked into a liquid reservoir of the liquid pump for pumping and dispensing by the next pressing.

In conventional press-type liquid pumps, the elastic restoring means is generally fitted between a movable unit (generally including a pressing head and a piston rod) and a fixed unit (generally including a cylinder) in a pre-loaded manner, so as to ensure that there is enough elastic force to enable the movable unit to be restored to the original position thereof relative to the fixed unit after the user has removed the downward pressing force. However, keeping the elastic restoring means in a loaded state for a long time would result in creeping and fatigue failure of the elastic means, ultimately resulting in an insufficient rebounding force to restore the movable unit into position, and thereby influencing the amount of liquid outputted by the liquid pump.

Furthermore, the conventional press-type liquid pumps mostly use a metal spring as the elastic restoring means, as shown in FIG. 49. The metal spring 1010 for use in this liquid pump rusts easily due to damp or contact with liquid, and a rusted spring affects the quality of the product (including the quality of the spring and the quality of the liquid product in the container). Moreover, the cost of the metal spring is relatively high, and in the recycling of the liquid pump, the metal spring needs to be disassembled from other plastic members for separate recovery, which greatly increases the cost of recovery.

Another press-type liquid pump is a bellows type plastic spring pump, as shown in FIG. 50, which uses an elastic force generated by the bellows 1110 when deformed to provide the power force for the restoring movement of the press-type liquid pump. However, this bellows type plastic spring inherently presents the problem of an insufficient elastic force, which, in the case that the liquid product is relatively viscous or a relatively high amount of liquid to be pumped out is required, will inevitably make a rebound difficult or even impossible, thereby affecting the use by consumers. Furthermore, in order to enable such a liquid pump to rebound into position during use, the bellows must be installed in a pre-loaded manner such that it has been subjected to a certain pre-stressed deformation before use; however, after it has been in place for a long time or due to changes in the ambient temperature, the bellows spring is prone to creeping, resulting in the previously stored elastic deformation disappearing, thereby resulting in a reduced rebounding force.

A further press-type liquid pump is a neck casing type plastic spring pump, as shown in FIG. 51 and as disclosed in U.S. Pat. No. 6,223,954. A disadvantage of the spring 1210 used in this liquid pump is that a very large downward pressing force is required to bend the spring when the pressing head is in the vicinity of an upper stop position of a pressing stroke, and the rebounding force that can be provided by this plastic spring is too small when the pressing head is in the vicinity of a lower stop position of the pressing stroke, resulting in a slow or incomplete restoration. Moreover, in terms of the appearance, the casing type spring is arranged above the toothed sleeve of the liquid pump, making the section above the toothed sleeve particularly bulky and even larger after a downward pressing, which is very unattractive.

CONTENTS OF THE PRESENT INVENTION

In view of the above problems existing in the prior art, an object of the present invention is to provide a press-type press liquid spring which can delay the occurrence of creeping and fatigue failure of an elastic restoring means.

Another object of the present invention is to provide a fully plastic press-type liquid pump, which can not only solve the problems of difficult disassembly, difficult recovery, high costs and easy pollution of the environment of the metal springs, but can also solve the problems of high downward pressing force and insufficient returning force in an existing plastic spring liquid pump.

According to one aspect of the present invention, a press-type liquid pump is provided for fitting to a container to pump a liquid product within said container to the exterior of said container, said liquid pump comprises a fixed unit fixed relative to said container and a movable unit capable of performing a reciprocating motion relative to said fixed unit, said liquid product is pumped to the exterior of said container by means of said reciprocating motion, and said reciprocating motion is achieved by a pressing force applied by a user to said movable unit to move said movable unit relative to said fixed unit along a longitudinal axis of said liquid pump in combination with an elastic restoring means for restoring said movable unit relative to said fixed unit along said longitudinal axis after said pressing force is removed. An improvement of the liquid pump lies in that, without said pressing force applied to said movable unit, said liquid pump is able to switch between a first position in which said elastic restoring means is in an unloaded state and a second position in which said elastic restoring means is in a pre-loaded state.

With the liquid pump of the present invention, since when no pressing force is applied to said movable unit, said liquid pump is able to switch between the first position in which said elastic restoring means is in the unloaded state and the second position in which said elastic restoring means is in the pre-loaded state, the elastic restoring means can be relaxed while the liquid pump is not in use, so as to avoid the situation where the elastic restoring means is in the loaded state for a long period, thus delaying the occurrence of creeping and fatigue failure thereof.

According to another aspect of the present invention, a press-type liquid pump is provided for fitting to a container to pump a liquid product within said container to the exterior of said container, said liquid pump comprises a fixed unit fixed relative to said container and a movable unit capable of performing a reciprocating motion relative to said fixed unit, said liquid product is pumped to the exterior of said container by means of said reciprocating motion, and said reciprocating motion is achieved by a pressing force applied by a user to said movable unit to move said movable unit relative to said fixed unit along a longitudinal axis of said liquid pump in combination with an elastic restoring means for restoring said movable unit relative to said fixed unit along said longitudinal axis after said pressing force is removed; said fixed unit comprises a toothed sleeve for fixing said liquid pump to said container and a cylinder which is located below and fixedly connected to said toothed sleeve, and said movable unit comprises a pressing head which is positioned above said toothed sleeve for the user to press and a piston rod which is positioned below and fixedly connected to said pressing head. An improvement of the liquid pump lies in that said elastic restoring means is a plastic elastic compressing means which is located below said toothed sleeve and installed between said piston rod and said cylinder, said plastic elastic compressing means comprises at least one elastic strip generally formed in an arc shape, and an upper end of said elastic strip acts on said piston rod and a lower end acts on said cylinder, such that a movement of said piston rod relative to said cylinder along said longitudinal axis causes said elastic strip to be elastically compressed.

In the present invention, a press-type liquid pump is also provided for fitting to a container to pump a liquid product within said container to the exterior of said container, said liquid pump comprises a fixed unit fixed relative to said container and a movable unit capable of performing a reciprocating motion relative to said fixed unit, said liquid product is pumped to the exterior of said container by means of said reciprocating motion, and said reciprocating motion is achieved by a pressing force applied by a user to said movable unit to move said movable unit relative to said fixed unit along a longitudinal axis of said liquid pump in combination with an elastic restoring means for restoring said movable unit relative to said fixed unit along said longitudinal axis after said pressing force is removed; said fixed unit comprises a toothed sleeve for fixing said liquid pump to said container, and said movable unit comprises a pressing head which is positioned above said toothed sleeve for a user to press. An improvement of the liquid pump lies in that said elastic restoring means is a plastic elastic compressing means which is installed between said pressing head and said toothed sleeve, said plastic elastic compressing means comprises at least two elastic strips which are equally spaced apart around said longitudinal axis, an upper end of each of said elastic strips acts on said pressing head and a lower end acts on said toothed sleeve, such that a movement of said pressing head relative to said toothed sleeve along said longitudinal axis causes said elastic strips to be elastically compressed, and the line of action of a resultant force of elastic forces generated by said elastic strips is always coincident with said longitudinal axis; each of said elastic strips is generally formed in an arc shape, and when uncompressed, a ratio of a length of said elastic strip from said upper end to said lower end along said arc shape to a distance thereof in the direction of said longitudinal axis is within a range greater than 1 and less than $\pi/2$.

In the present invention, further provided is a press-type liquid pump for fitting to a container to pump a liquid product within said container to the exterior of said container, said liquid pump comprises a fixed unit fixed relative to said container and a movable unit capable of performing a reciprocating motion relative to said fixed unit, said liquid product is pumped to the exterior of said container by means of said reciprocating motion, and said reciprocating motion is achieved by a pressing force applied by a user to said movable unit to move said movable unit relative to said fixed unit along a longitudinal axis of said liquid pump in combination with an elastic restoring means for restoring said movable unit relative to said fixed unit along said longitudinal axis after said pressing force is removed; said fixed unit comprises a toothed sleeve for fixing said liquid pump to said container and a cylinder bracket fixed relative to said toothed sleeve, a bellows cylinder is installed on said cylinder bracket, a lower end of said bellows cylinder is fixed to said cylinder bracket, said movable unit comprises a pressing head which is positioned above said toothed sleeve for a user to press, and an upper end of said bellows cylinder is fixed relative to said pressing head. An improvement of the liquid pump lies in that said elastic restoring means is a plastic elastic compressing means which is located below said toothed sleeve and installed between said cylinder bracket and said pressing head, said plastic elastic compressing means comprises at least one elastic strip generally formed in an arc shape, an upper end of said elastic strip acts on said upper end of said bellows cylinder and a lower end acts on said cylinder bracket, such that a movement of said pressing head relative to said cylinder bracket along said longitudinal axis causes said elastic strip to be elastically compressed, and the line of action of a resultant force of elastic forces generated by said elastic strip is always coincident with said longitudinal axis.

In the present invention, further provided is a press-type liquid pump for fitting to a container to pump a liquid product within said container to the exterior of said container, said liquid pump comprises a fixed unit fixed relative to said container and a movable unit capable of performing a reciprocating motion relative to said fixed unit, said liquid product is pumped to the exterior of said container by means of said reciprocating motion, and said reciprocating motion is achieved by a pressing force applied by a user to said movable unit to move said movable unit relative to said fixed unit along a longitudinal axis of said liquid pump in combination with an elastic restoring means for restoring said movable unit relative to said fixed unit along said longitudinal axis after said pressing force is removed; said fixed unit comprises a toothed sleeve for fixing said liquid pump to said container and a piston rod fixed relative to said toothed sleeve, and said movable unit comprises a pressing head which is positioned above said toothed sleeve for a user to press and a cylinder which is fixedly connected to said pressing head. An improvement of the liquid pump lies in that said elastic restoring means is a plastic elastic compressing means which is located below said toothed sleeve and installed between said cylinder and said piston rod, said plastic elastic compressing means comprises at least one elastic strip generally formed in an arc shape, an upper end of said elastic strip acts on said cylinder and a lower end acts on said piston rod, such that a movement of said cylinder relative to said piston rod along said longitudinal axis causes said elastic strip to be elastically compressed, and the line of action of a resultant force of elastic forces generated by said elastic strip is always coincident with said longitudinal axis.

With the above-mentioned liquid pumps of the present invention, since an elastic restoring means made of a plastic is provided, the problems of difficult disassembly, difficult recovery, high cost and easy pollution of the environment of metal springs are solved; meanwhile, the use of the elastic restoring means in the form of an arc-shaped elastic strip solves the problems of high hand pressing force and insufficient rebounding force of existing plastic spring liquid pumps.

In addition, the elastic restoring means of the present invention is arranged at a position below the toothed sleeve, which position is hidden within the product container and not exposed in normal use, thus not only can the damage to the elastic restoring means due to an external collision be avoided, but also the aesthetics of a product container equipped with the liquid pump can be improved.

Further features and advantages of the present invention will emerge from the following description of exemplary embodiments with reference to the accompanying drawings.

DESCRIPTION OF THE DRAWINGS

FIG. 1 is a sectional view of a press-type liquid pump according to a first embodiment of the present invention in a head locked (pressing head locked) state;

FIG. 2 is a sectional view of the liquid pump shown in FIG. 1 in an unlocked state;

FIG. 3 is a sectional view of the liquid pump shown in FIG. 1 in a downwardly pressed state;

FIG. 7 shows various views of a cylinder of the liquid pump shown in FIG. 1;

FIG. 19 is a sectional view of a press-type liquid pump according to a fourth embodiment of the present invention in a head locked state;

FIG. 20 is a sectional view of the liquid pump shown in FIG. 19 in an unlocked state;

FIG. 21 is a sectional view of the liquid pump shown in FIG. 19 in a downwardly pressed state;

FIG. 24 shows various views of another variant of the elastic restoring means shown in FIG. 23;

FIG. 30 shows various views of an elastic restoring means of the liquid pump shown in FIG. 28;

FIG. 31 shows various views of a variant of the elastic restoring means shown in FIG. 30;

FIG. 32 shows various views of a cylinder of the liquid pump shown in FIG. 28;

FIG. 33 is a sectional view of a press-type liquid pump according to a seventh embodiment of the present invention in a head locked state;

FIG. 34 is a side view of the liquid pump shown in FIG. 33 in an unlocked state;

FIG. 35 is a sectional view of the liquid pump shown in FIG. 33 in a downwardly pressed state;

FIG. 37 is a sectional view of a press-type liquid pump according to an eighth embodiment of the present invention in a head locked state;

FIG. 38 is a side view of the liquid pump shown in FIG. 37 in an unlocked state;

FIG. 39 is a sectional view of the liquid pump shown in FIG. 37 in a downwardly pressed state;

FIG. 40 shows various views of a piston rod of the liquid pump shown in FIG. 37;

FIG. 41 shows various views of an elastic tension spring bracket of the liquid pump shown in FIG. 37, the elastic spring bracket together with the piston rod in FIG. 37 also constituting a still further version of a cam actuation mechanism of the present invention;

PARTICULAR EMBODIMENTS

Figure 4:
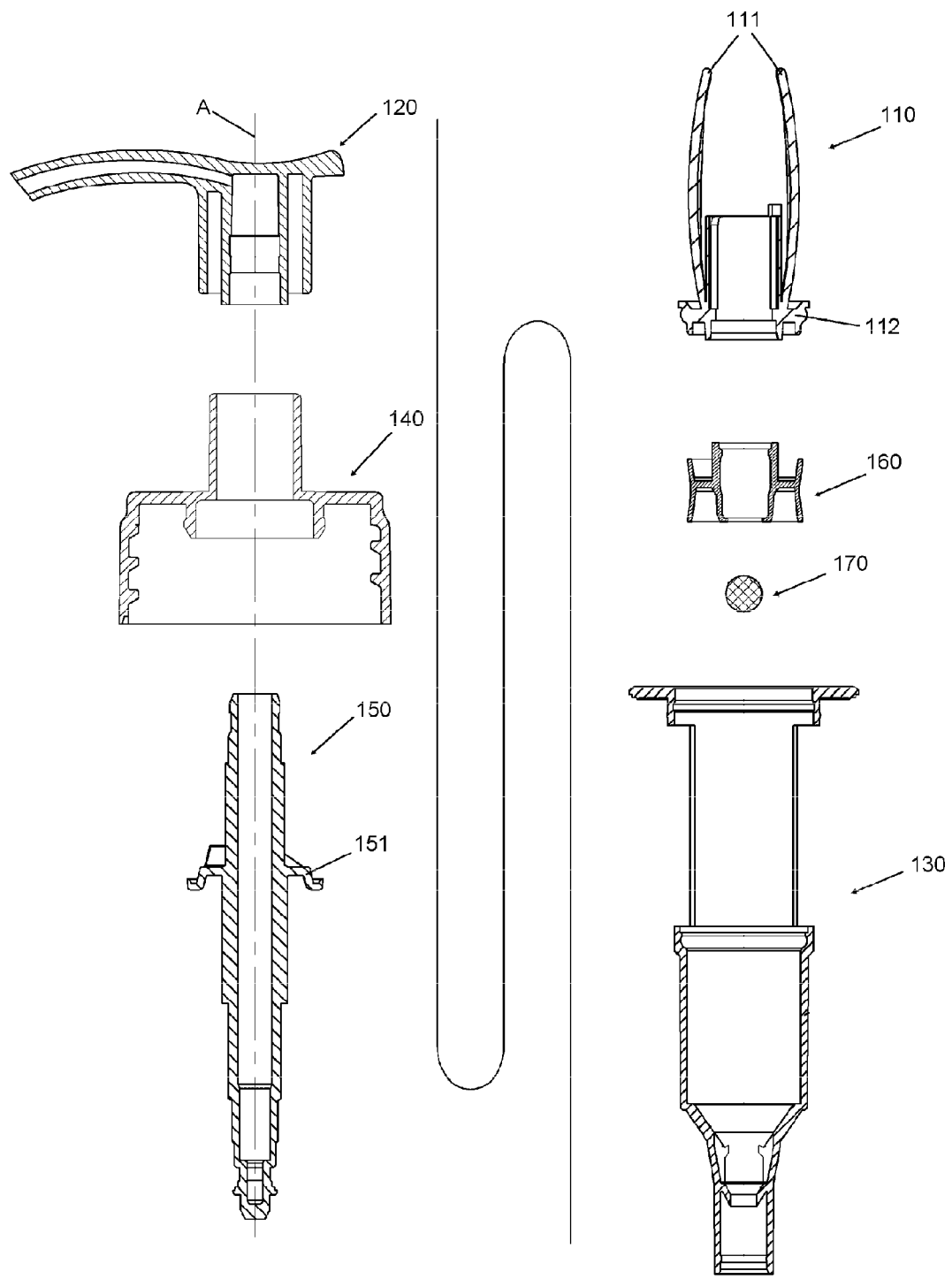
FIG. 4 is an exploded schematic view of the liquid pump shown in FIG. 1.

First of all, it is to be mentioned here that the terms "upper" and "lower" used herein are determined with respect to the liquid pump being placed in a vertical orientation (i.e. the liquid pump is arranged with the direction of the longitudinal axis thereof consistent with the vertical direction).

Embodiment 1

Reference is made to FIGS. 1-7, which show a press-type liquid pump according to a first embodiment of the present invention. The press-type liquid pump is fitted onto a container (not shown) to pump a liquid product within the container to the exterior of the container. In general, the liquid pump comprises a fixed unit fixed relative to the container and a movable unit capable of performing a reciprocating motion relative to the fixed unit, and the liquid product is pumped to the exterior of the container by means of the reciprocating motion. The reciprocating motion is achieved by a pressing force applied by a user to the movable unit to move the movable unit relative to the fixed unit along a longitudinal axis A of the liquid pump in combination with an elastic force of an elastic restoring means for restoring the movable unit relative to the fixed unit along the longitudinal axis A of the liquid pump after the pressing force is removed. In the embodiment, the fixed unit comprises a toothed sleeve 140 for fixing the liquid pump to the container and a cylinder 130 which is located below and fixedly connected to the toothed sleeve 140, and the movable unit comprises a pressing head 120 which is positioned above the toothed sleeve 140 for a user to press and a piston rod 150 which is positioned below and fixedly connected to the pressing head 120.

According to one aspect of the present invention, the elastic restoring means is an elastic compressing means 110 made of plastic, which is located below the toothed sleeve 140 and installed between the piston rod 150 and the cylinder 130, the plastic elastic compressing means 110 comprises two elastic strips 111 arranged symmetrically about the longitudinal axis A, an upper end of each of the elastic strips 111 acts on the piston rod 150 and a lower end acts on the cylinder 130, such that a movement of the piston rod 150 relative to the cylinder 130 along the longitudinal axis A causes the elastic strips 111 to be elastically compressed, and the line of action of a resultant force of elastic forces generated by the elastic strips 111 is always coincident with the longitudinal axis A. Since the elastic compressing means is made of a plastic, the liquid pump may be free of any metallic material, which is very conducive to recovery of the product. In addition, arranging the elastic compressing means 110 at a position below the toothed sleeve 140 can prevent the elastic compressing means from being exposed outside the liquid pump and the container, thus improving the overall aesthetics of the product.

Each of the elastic strips 111 is generally formed in an arc shape, and preferably, when uncompressed, a ratio of a length of each of the elastic strips 111 from the upper end to the lower end along the arc shape and a distance thereof in the direction of the longitudinal axis A is within a range greater than 1 and less than $\pi/2$. This arc-shaped structure helps to obtain relatively high utilization of the elastic force of the elastic strips, avoiding the situation in which a too large downward pressing force is required when the pressing head is in the vicinity of an upper stop position of a pressing stroke and the rebounding force provided by the elastic strips is too small when the pressing head is in the vicinity of a lower stop position of the pressing stroke.

Figure 5A:
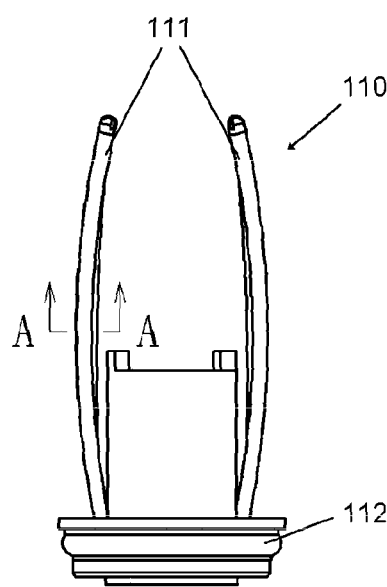
FIG. 5 shows various views of an elastic restoring means of the liquid pump shown in FIG. 1.
Figure 5B:
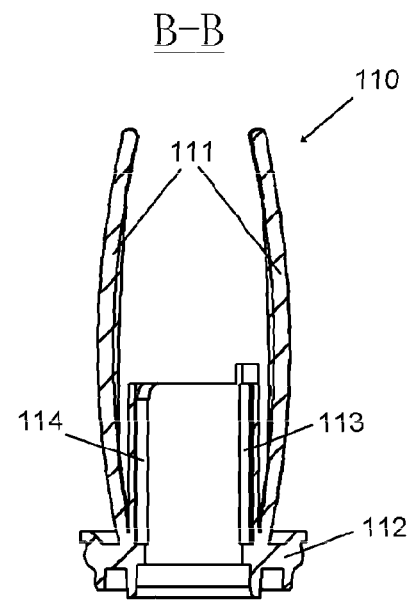
Figure 5C:
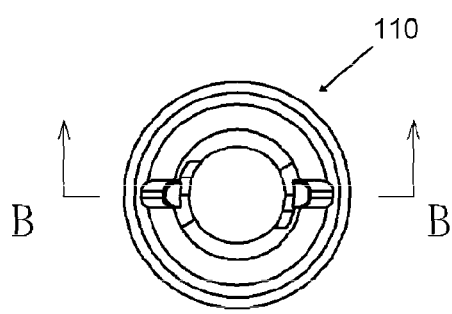
Figure 5D:
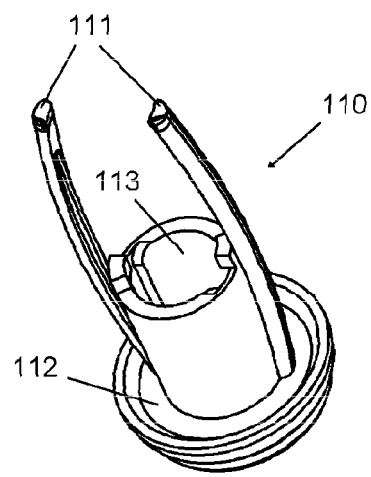
Figure 5E:
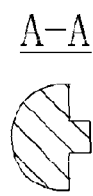
Figure 6A:
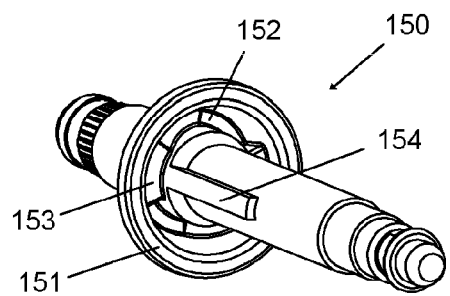
FIG. 6 shows various views of a piston rod of the liquid pump shown in FIG. 1, the piston rod comprising a cam actuation mechanism of the present invention.
Figure 6B:
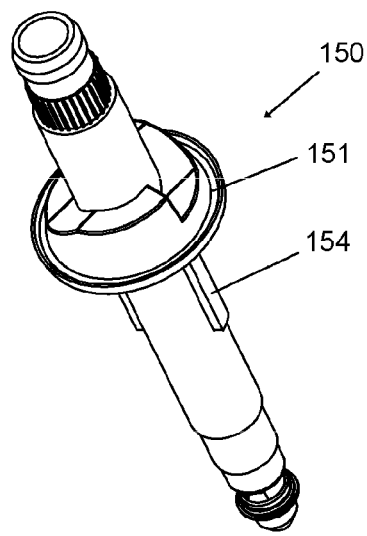
Figure 6C:
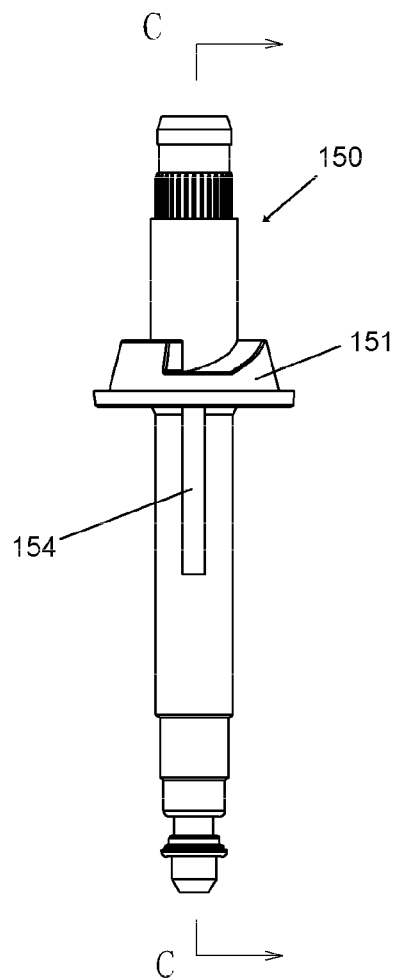
Figure 6D:
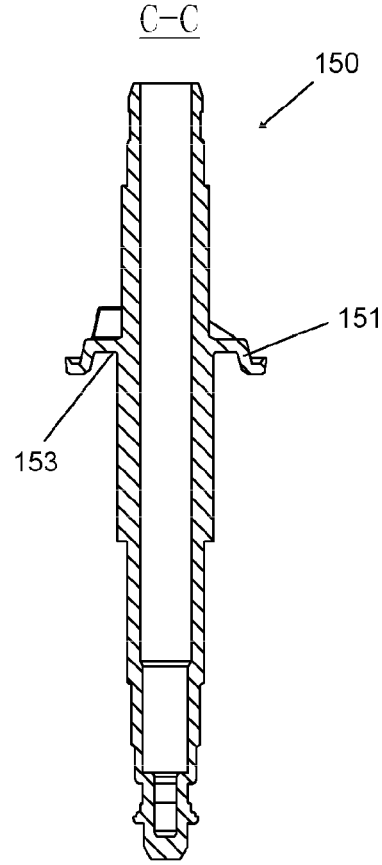
Figure 10:
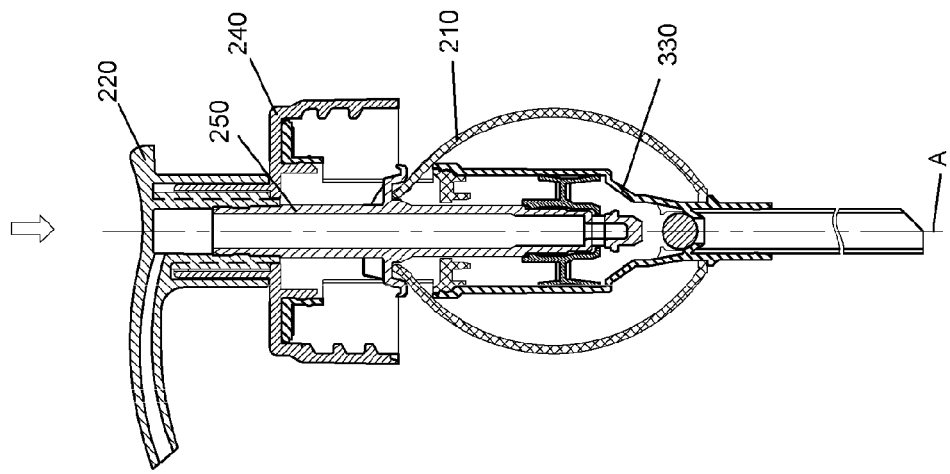
FIG. 10 is a sectional view of the liquid pump shown in FIG. 8 in a downwardly pressed state.
Figure 9:
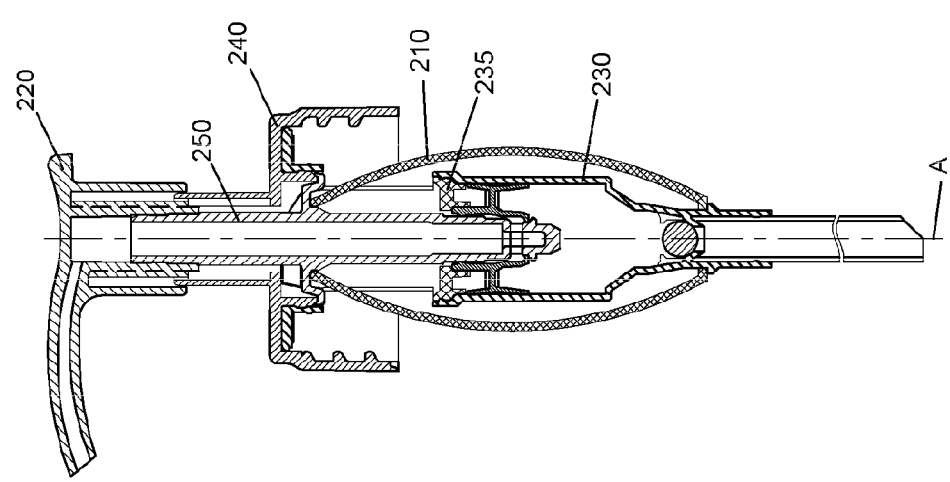
FIG. 9 is a sectional view of the liquid pump shown in FIG. 8 in an unlocked state.
Figure 8:
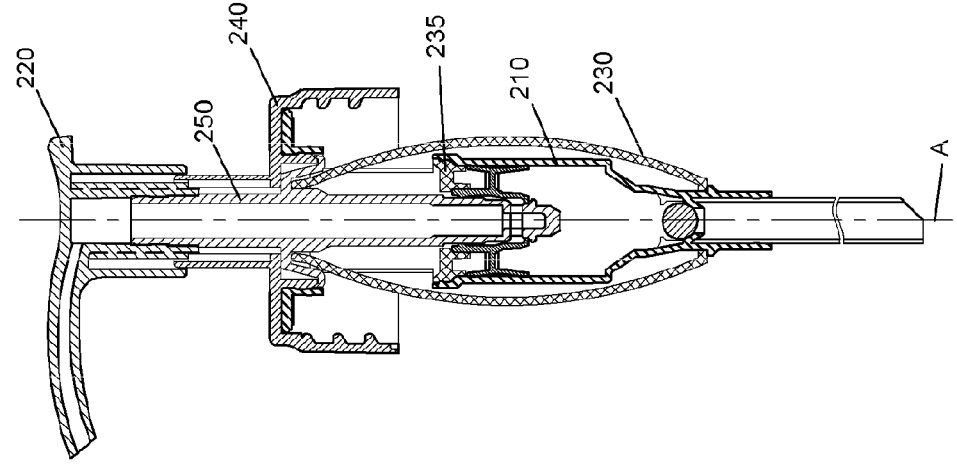
FIG. 8 is a sectional view of a press-type liquid pump according to a second embodiment of the present invention in a head locked state.
Figure 11A:
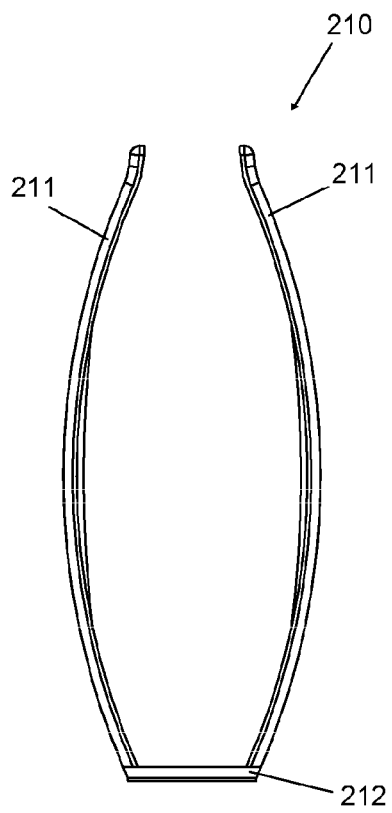
FIG. 11 shows various views of an elastic restoring means of the liquid pump shown in FIG. 8.
Figure 11B:
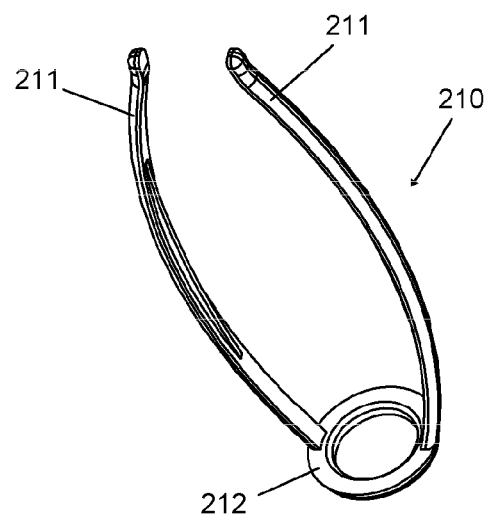
Figure 11C:
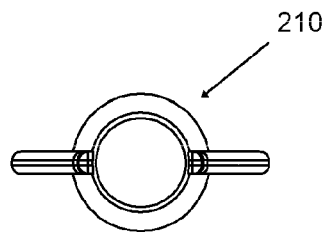
Figure 12A:
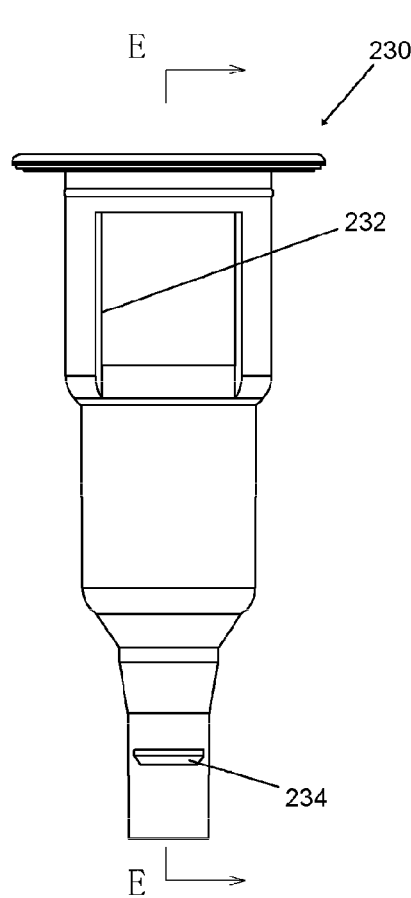
FIG. 12 shows various views of a cylinder of the liquid pump shown in FIG. 8.
Figure 12B:
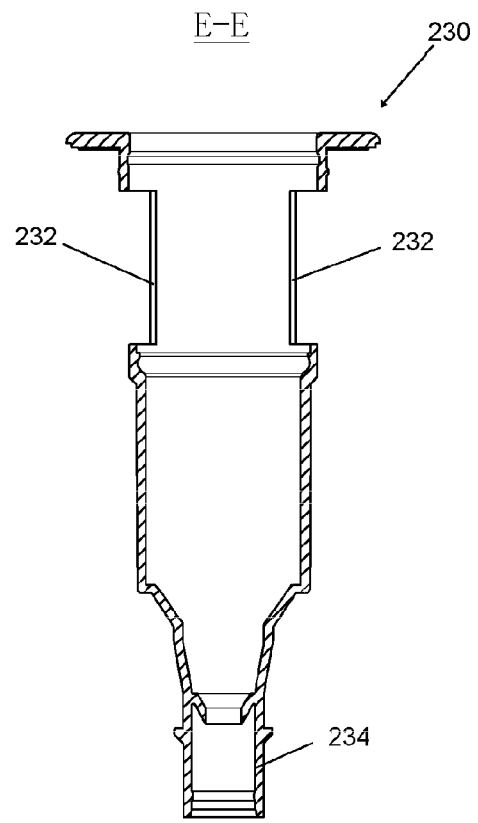
Figure 12C:
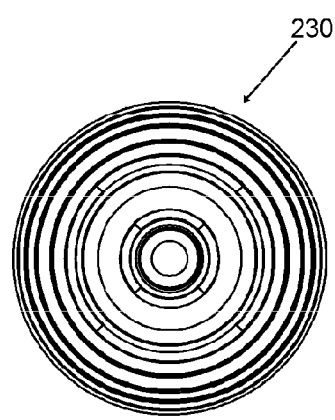
Figure 12D:
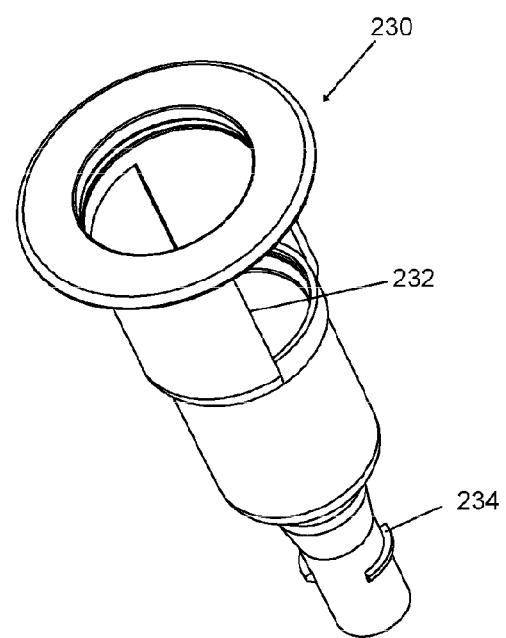
Figure 15:
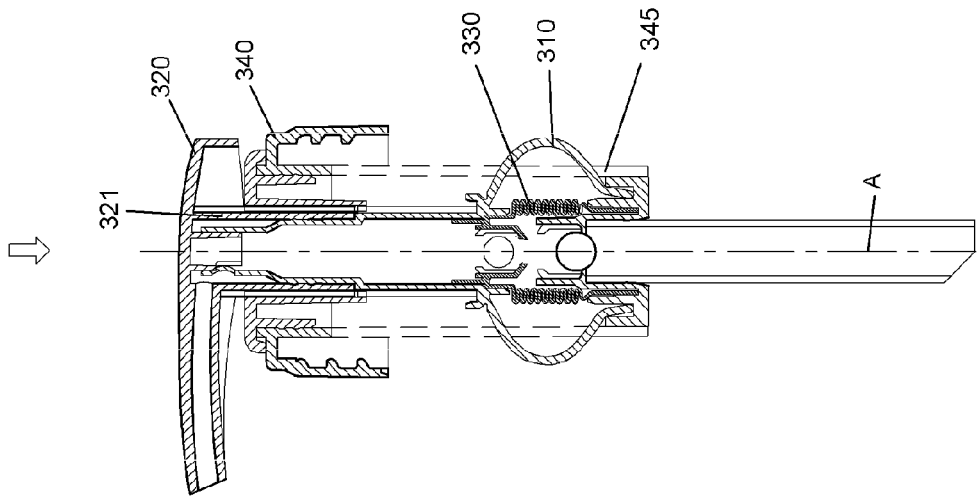
FIG. 15 is a sectional view of the liquid pump shown in FIG. 13 in a downwardly pressed state.
Figure 14:
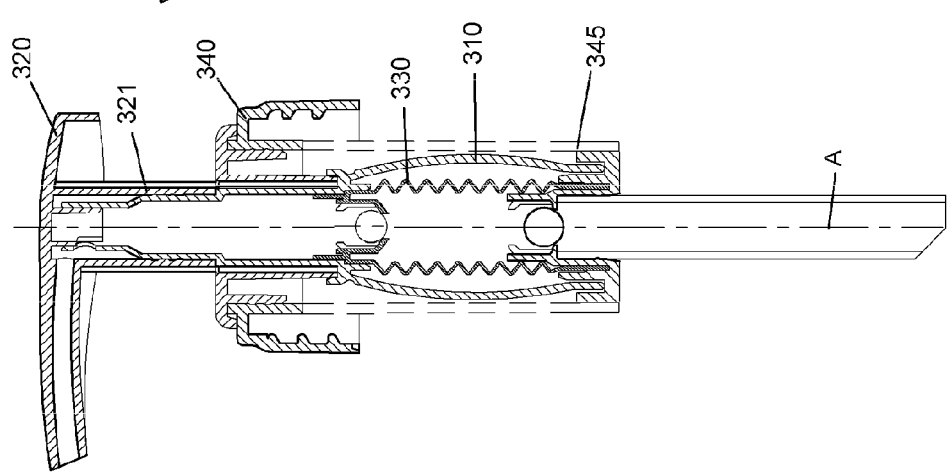
FIG. 14 is a sectional view of the liquid pump shown in FIG. 13 in an unlocked state.
Figure 13:
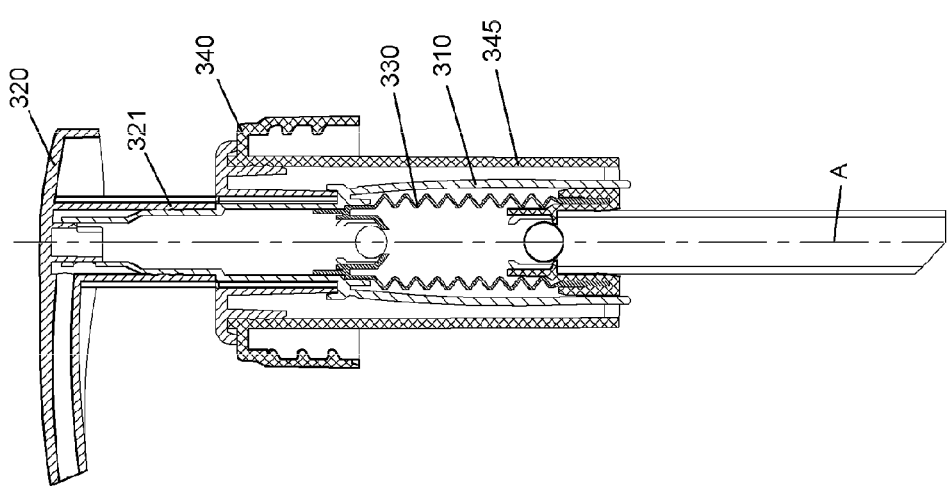
FIG. 13 is a sectional view of a press-type liquid pump according to a third embodiment of the present invention in a head locked state.
Figure 16A:
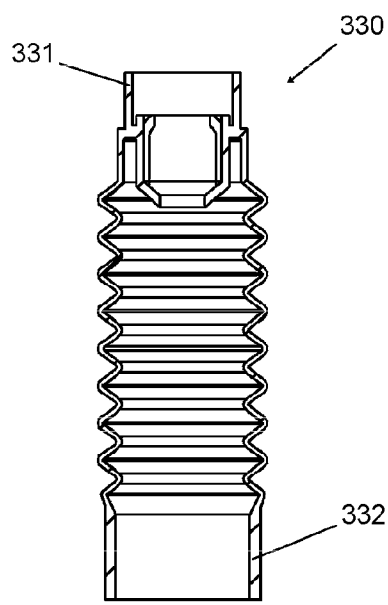
FIG. 16 shows various views of a bellows of the liquid pump shown in FIG. 13.
Figure 16B:
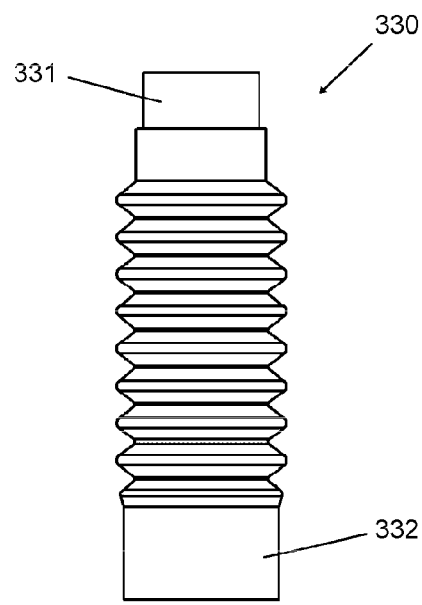
Figure 16C:
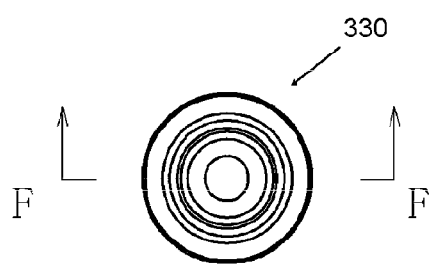
Figure 16D:
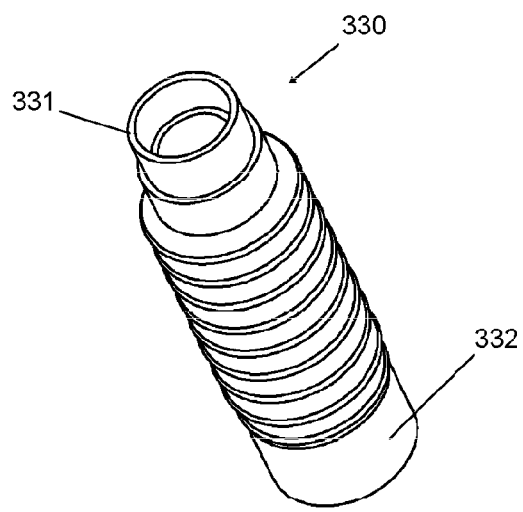
Figure 17A:
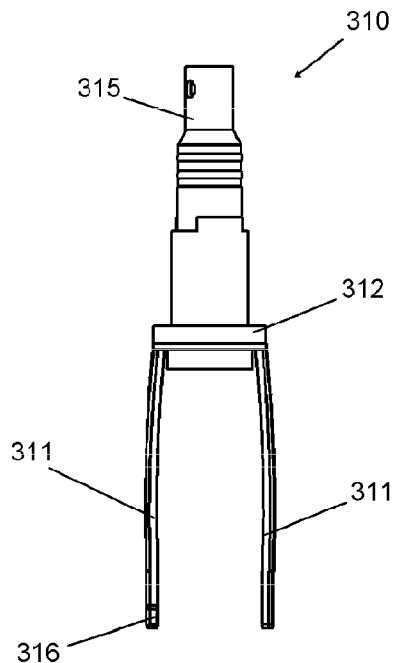
FIG. 17 shows various views of an elastic restoring means of the liquid pump shown in FIG. 13.
Figure 17B:
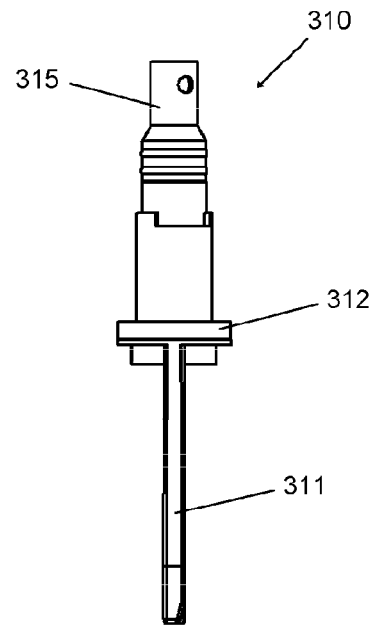
Figure 17C:
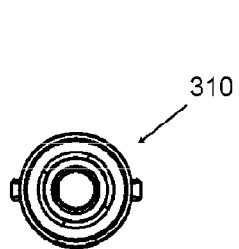
Figure 17D:
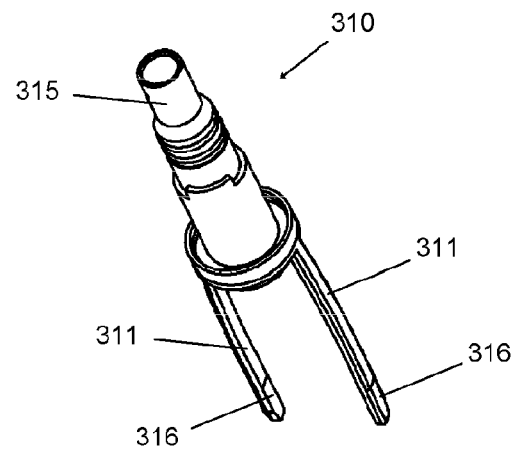
Figure 18A:
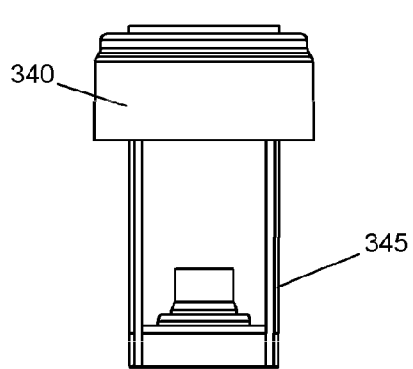
FIG. 18 shows various views of a cylinder of the liquid pump shown in FIG. 13, the cylinder comprising another version of the cam actuation mechanism of the present invention.
Figure 18B:
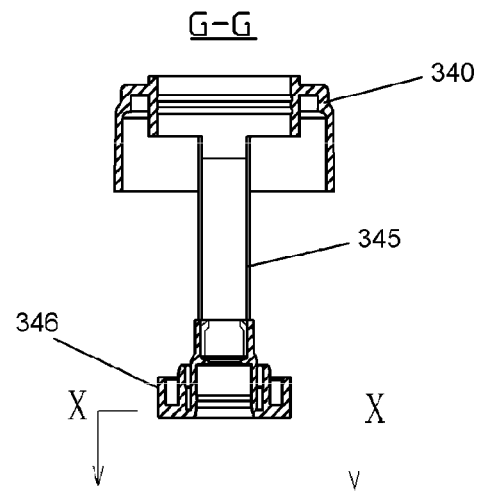
Figure 18C:
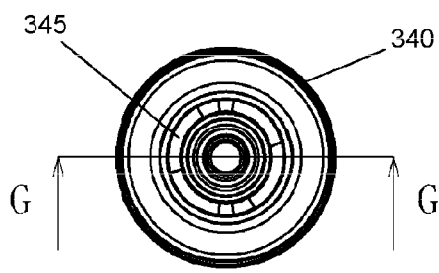
Figure 18D:
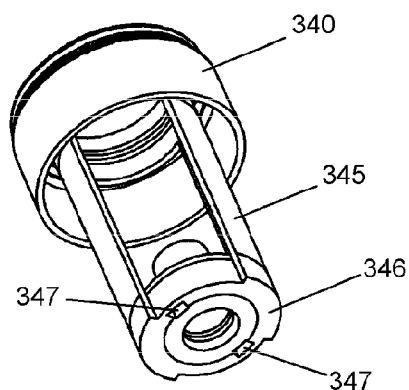
Figure 18E:
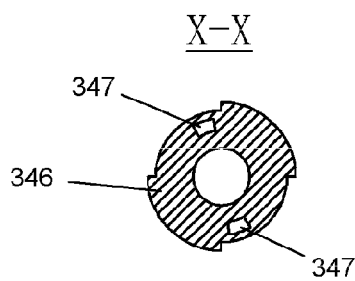
Figure 22A:
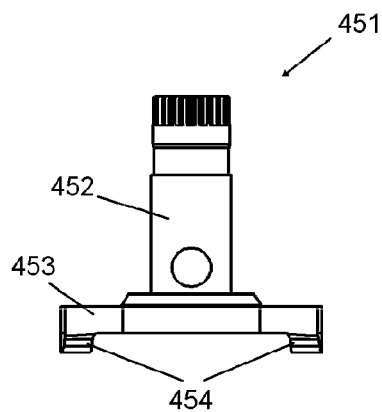
FIG. 22 shows various views of a piston head of the liquid pump shown in FIG. 19.
Figure 22B:
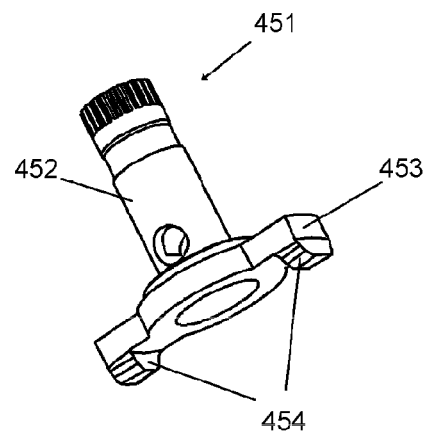
Figure 22C:
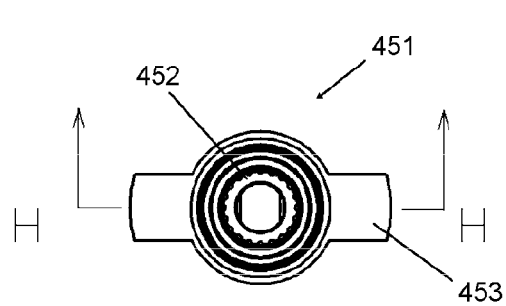
Figure 22D:
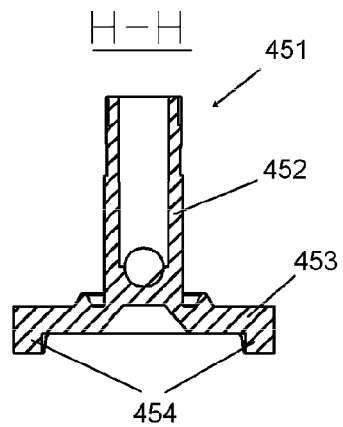

Due to the arc shape, each of the elastic strips 111 is adapted to deform in the plane of the arc shape. In the embodiment, the plane of deformation is a plane passing through the longitudinal axis A. The cross section of each elastic strip is in a substantially semi-circular shape, as shown in FIG. 5e, but may be in another suitable shape.

The lower ends of two elastic strips 111 are fixed to a base 112 which is formed with a central through-hole 113 for the piston rod 150 to pass through. The base 112 is also used as a cylinder plug for sealing an opening portion of the cylinder 130.

The cylinder 130 is in a generally cylindrical shape, an upper end thereof is formed with an annular flange 133, and the flange 133 is fixed at the opening portion of the container by means of the toothed sleeve 140. A liquid storage chamber 131 is formed in a lower portion of the cylinder 130, for storing the liquid product sucked out of the container. The upper portion of the cylinder 130 is formed with hollow portions 132 which are opposite to each other in a diametrical direction, to allow the elastic strips 111 of the elastic compressing means 110 to deform radially outwardly and pass through, as shown in FIG. 3.

According to another aspect of the present invention, when no pressing force is applied to the movable unit (i.e. the pressing head 120 and the piston rod 150), that is to say in a non-use state, the liquid pump is able to switch between a first position (or state) in which the elastic compressing means 110 is in an unloaded state and a second position in which the elastic compressing means is in a pre-loaded state. In this embodiment, the switching of the liquid pump between the first position and the second position is realized by means of rotating the pressing head 120 and the piston rod 150 by 90 degrees relative to the toothed sleeve 140 around the longitudinal axis A.

A flange 151 is formed on the piston rod 150 and has bearing faces 152 and 153 at different levels in the direction of the longitudinal axis A. In the embodiment, the bearing face 152 at a higher level and the bearing face 153 at a lower level are each divided into two segments which are opposite to each other in the diametrical direction of the piston rod 150, and the bearing face 152 and the bearing face 153 are staggered from each other by 90 degrees in the direction of rotation of the piston rod 150. The bearing faces 152 and 153 cooperate with the upper ends of the elastic strips 111 of the elastic compressing means 110, so as to be used as upper bearing points of the elastic compressing means. A transitional ramp is provided between the bearing face 152 and the bearing face 153 in order to transfer the upper ends of the elastic strips 111 between the two bearing faces.

When the bearing face 152 at a higher level mates with the upper ends of two elastic strips 111, the elastic strips 111 are in a relaxed state so that the elastic compressing means 110 is in the unloaded state. When the piston rod 150 is rotated by 90 degrees such that the bearing face 153 at a lower level mates with the upper ends of two elastic strips 111, the elastic strips 111 are slightly compressed so that the elastic compressing means 110 is in the pre-loaded state.

In this embodiment, the flange 151 with the bearing faces 152 and 153 is equivalent to a cam member, which constitutes a cam actuation mechanism together with the upper ends of the elastic compressing means 110, and the cam actuation mechanism longitudinally compresses or stretches the elastic compressing means 110 in response to rotation of the movable unit (the pressing head 120 and the piston rod 150) around the longitudinal axis.

Two protruding ribs 54 are formed on the piston rod 150 at a position corresponding to the bearing face 153 at a lower level, and can mate with two corresponding grooves 113 which are formed in the elastic central through-hole 113 of the base 112 of the elastic compressing means 110, so as to prevent the pressing head 120 from being downwardly pressed when the protruding ribs 154 are staggered from the grooves 113 (whereupon the liquid pump is in the head locked state), and to allow the pressing head 120 to be pressed when the protruding ribs 154 are aligned with the grooves 113 (whereupon the liquid pump is in the unlocked state). In this embodiment, the first position in which the elastic compressing means is in the unloaded state corresponds to the head locked state, and the second position in which the elastic compressing means is in the pre-loaded state corresponds to the unlocked state.

While the liquid pump is not in use, the pressing head 120 (i.e. the piston rod 150) may be rotated to the head locked state, such that the liquid pump is in the first position in which the elastic compressing means 110 is unloaded, thereby relaxing the elastic compressing means 110. When the liquid pump is to be used, the pressing head 120 may be rotated to the unlocked state, such that the liquid pump is in the second position in which the elastic compressing means 110 is pre-loaded, thereby helping the elastic compressing means 110 to apply a restoring force to the piston rod 150.

Furthermore, the liquid pump further has a piston 60, a one-way ball valve 70 and other components which are known technically. All components of the liquid pump can be made of plastic materials to facilitate recycling.

Embodiment 2

Reference is made to FIGS. 8-12 below, in which a press-type liquid pump according to a second embodiment of the present invention is shown. The general structure of the press-type liquid pump is substantially identical to the first embodiment. Specifically, the liquid pump generally comprises a plastic elastic compressing means 210, a pressing head 220, a cylinder 230, a toothed sleeve 240, a piston rod 250 and other components.

Unlike the first embodiment, the lower end of the elastic compressing means 210 comprises a base 212 connecting the lower ends of the elastic strips 211, and the base is in the form of a ring and acts on a tab 234 which is formed on the outer periphery of a lower portion of the cylinder 230. In this case, there is a need for a separate cylinder plug 235 to seal the opening portion of the cylinder, and a central through-hole is formed in the cylinder plug 235 for the piston rod 250 to pass through.

As shown in FIG. 12, the upper portion of the cylinder 230 is formed with hollow portions 232 which are opposite to each other in a diametrical direction, to allow two elastic strips 211 of the elastic compressing means 210 to pass through from the inside of the cylinder to the outside of the cylinder.

With this embodiment, since the lower end of the elastic compressing means 210 acts on the lower portion of the cylinder 230, rather than acting on the opening portion in a relatively upper position of the cylinder as in the first embodiment, there is no need to make the length of the cylinder relatively long to ensure that the elastic compressing means has elastic strips long enough. It is therefore possible to shorten the length of the cylinder, and in turn to shorten the length of the entire liquid pump.

Embodiment 3

Reference is made to FIGS. 13-18 below, in which a press-type liquid pump of a third embodiment of the present invention is shown. The liquid pump generally comprises a plastic elastic compressing means 310, a pressing head 320, a bellows cylinder 330, a toothed sleeve 340, a cylinder bracket 345 and other components. In the liquid pump, the movable unit comprises the pressing head 320, and the fixed unit comprises the toothed sleeve 340 and the cylinder bracket 345 which is formed integrally with the toothed sleeve.

The plastic elastic compressing means 310 comprises two arc-shaped elastic strips 311 which are arranged symmetrically about the longitudinal axis A of the liquid pump and a base 312 which connects the upper ends of the two elastic strips 311. Each of the elastic strips 311 is adapted to deform in the plane of the arc shape, and the plane passes through the longitudinal axis A. This configuration makes the line of action of a resultant force of elastic forces generated by the elastic strips 311 always coincident with the longitudinal axis A. The base 312 has a connecting sleeve 315 which extends upwardly, and the connecting sleeve is drivably connected to a downwardly extending connecting conduit 321 which is formed on the pressing head 320, such that the rotation of the pressing head 320 is able to drive the elastic compressing means 310 to rotate. The lower ends of the elastic strips 311 are formed with guide ramps 316 in the same direction of rotation about the longitudinal axis, as described below, and the guide ramp is used as a cam face.

The upper end 331 of the bellows cylinder 330 is connected to the base 312 of the elastic compressing means 310 and the lower end 332 thereof is fixed to the cylinder bracket 345, such that the bellows cylinder 330 can be stretched and compressed following upward and downward movements of the pressing head 320, thereby achieving the pumping.

As shown in FIG. 18, the cylinder bracket 345 comprises a bottom plate 346 which is generally formed in a circular ring shape, and the bottom plate is formed with two through holes 347 which are opposite to each other in a diametrical direction of the circular ring-shaped bottom plate. The through hole 347 is sized to allow the elastic strip 311 of the elastic compressing means 310 to pass through.

In the first position of the liquid pump, the pressing head 320 is in the head locked state, that is to say it cannot be downwardly pressed relative to the toothed sleeve 340 (the specific structure is not repeated here). At this time, the elastic strips 311 of the elastic compressing means 310 slightly protrude from the through holes 347 which are formed in the bottom plate 346 of the cylinder bracket 345, and thus are in the unloaded state. When the pressing head 320 is rotated by an angle (e.g. 90 degrees) to switch the liquid pump from the first position to the second position, the pressing head 320 is then switched to the unlocked position, i.e. is able to be pressed downwardly relative to the toothed sleeve 340. At this time, the elastic compressing means 310 is correspondingly rotated such that the lower ends of the elastic strips 311 are removed from the through holes 347 under the guidance of the guide ramp 316 and abut against an upper surface of the bottom plate 346 to slightly compress the elastic strips 311. The elastic compressing means 310 is therefore switched to the pre-loaded state.

In this embodiment, the bottom plate of the cylinder bracket 345 that has the through holes 347 and the lower end of the elastic compressing means 310 that has the guide ramp 316 constitute a cam actuation mechanism, which longitudinally compresses or stretches the elastic compressing means 310 in response to the rotation of the movable unit (the pressing head 320) about the longitudinal axis A.

In the second position in which the elastic compressing means 310 is in the pre-loaded state, the pressing head 320 can perform a reciprocating motion under the pressing action applied by the user and the upward restoring action of the elastic compressing means 310, so that the pumping function is achieved.

Embodiment 4

Reference is made to FIGS. 19-24 below, in which a press-type liquid pump according to a fourth embodiment of the present invention is shown. In a similar manner to the structure of the above-described embodiments, the press-type liquid pump generally comprises a fixed unit fixed relative to a container and a movable unit capable of performing a reciprocating motion relative to the fixed unit, and the liquid product is pumped to the exterior of the container by means of the reciprocating motion. In the embodiment, the fixed unit comprises a toothed sleeve 440 for fixing the liquid pump to the container and a cylinder 430 which is located below and fixedly connected to the toothed sleeve 440, and the movable unit comprises a pressing head 420 which is positioned above the toothed sleeve 440 for a user to press and a piston rod 450 which is positioned below and fixedly connected to the pressing head 420.

The elastic restoring means is an elastic compressing means 410 made of a plastic, which is located below the toothed sleeve 440 and installed between the piston rod 450 and the cylinder 430. Specifically, the elastic compressing means 410 is accommodated in the cylinder 430, and the lower end thereof abuts against the lower end of the cylinder 430 and the upper end thereof abuts against the lower end of the piston rod 450. The plastic elastic compressing means 410 comprises two elastic strips 111 arranged symmetrically about the longitudinal axis A, the upper ends of the various elastic strips 411 are connected by an upper base 412a in the form of a ring, and the lower ends thereof are connected by a lower base 412b in the form of a ring. A movement of the piston rod 450 relative to the cylinder 430 along the longitudinal axis A causes the elastic strips 411 to be elastically compressed, and the line of action of a resultant force of elastic forces generated by the elastic strips 411 is always coincident with the longitudinal axis A.

Each of the elastic strips 411 is generally formed in a radially inwardly concave arc shape, and preferably, when uncompressed, a ratio of a length of each of the elastic strips 411 from the upper end to the lower end along the arc shape to a distance thereof in the direction of the longitudinal axis A is within a range greater than 1 and less than $\pi/2$. When compressed, the two elastic strips 411 are deformed in one and the same plane which passes through the longitudinal axis A.

The ring of the lower base 412b is generally rectangular, and the ring of the upper base 412a is generally circular. The ring of the lower base 412b generally extends in one plane, but the ring of the upper base 412a does not extend in one and the same plane. Specifically, the ring of the upper base 412a has two bearing faces 413 at a higher level and two bearing faces 414 at a lower level in the direction of the longitudinal axis A, and a phase difference between the bearing faces 413 and the bearing faces 414 in the direction of rotation is approximately 90 degrees. Moreover, the higher bearing faces 413 and the lower bearing faces 414 are relatively smoothly connected by a transitional ramp.

When no pressing force is applied to the movable unit (i.e. the pressing head 420 and the piston rod 450), that is to say in the non-use state, the liquid pump is able to switch between a first position in which the elastic compressing means 410 is in an unloaded state and a second position in which the elastic compressing means 410 is in a pre-loaded state. In the embodiment, the switching of the liquid pump between the first position and the second position is realized by means of rotating the pressing head 420 and the piston rod 450 by approximately 90 degrees relative to the toothed sleeve 440 around the longitudinal axis A.

The piston rod 450 comprises a piston head 451 at the lower end thereof, and the piston head is generally formed in a T shape, as shown in FIG. 22. The piston head 451 comprises an engaging rod part 453 which is located at the lower portion thereof and a connecting tube part 452 which is located at the upper portion thereof. The connecting tube part 452 is connected to the main body portion of the piston rod 450. An engaging portion 454 is formed at the lower side of the engaging rod part 453 and at two ends of the rod, for engaging with the upper base 412a of the elastic compressing means 410. When the liquid pump is in the first position, i.e. the head locked state, the engaging portion 454 of the piston head 451 of the piston rod 450 engages with the lower bearing faces 414 of the upper base 412a of the elastic compressing means 410, so as to relax the elastic strips 411 of the elastic compressing means 410, so that the elastic compressing means 410 is in the unloaded state. When the pressing head 420 and the piston rod 450 are rotated by 90 degrees to switch the liquid pump from the first position to the second position, the engaging portion 454 of the piston rod 450 engages with the higher bearing faces 413 of the elastic compressing means 410, so as to compress the elastic strips 411, so that the elastic compressing means 410 is in the pre-loaded state.

In the embodiment, the upper surface of the elastic compressing means 410 that has the bearing faces 413 and 414 at different levels constitutes a cam face, the cam face and the engaging portion 454 of the lower end of the piston rod 450 constitute a cam actuation mechanism, and the cam actuation mechanism longitudinally compresses or stretches the elastic compressing means 410 in response to the rotation of the movable unit (the pressing head 420 and the piston rod 450) around the longitudinal axis A.

In the second position in which the elastic compressing means 410 is in the pre-loaded state, the pressing head 420 can perform a reciprocating motion under the pressing action applied by the user and the upward restoring action of the elastic compressing means 410, so that the pumping function is achieved.

Figure 23A:
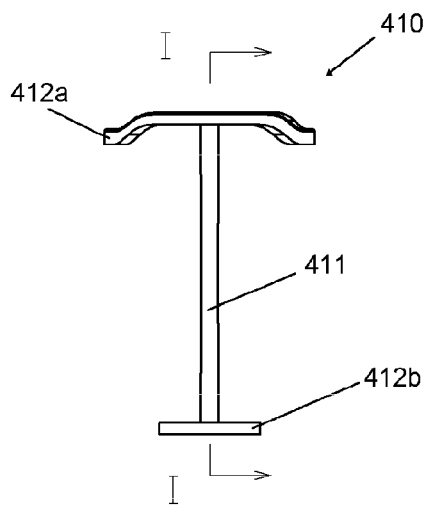
FIGS. 23a-d are various views of an elastic restoring means of the liquid pump shown in FIG. 19, the elastic restoring means together with the piston head in FIG. 22 also constituting yet another version of the cam actuation mechanism of the present invention.
Figure 23B:
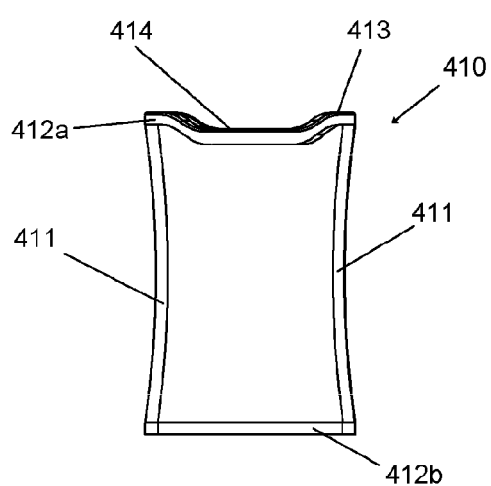
Figure 23C:
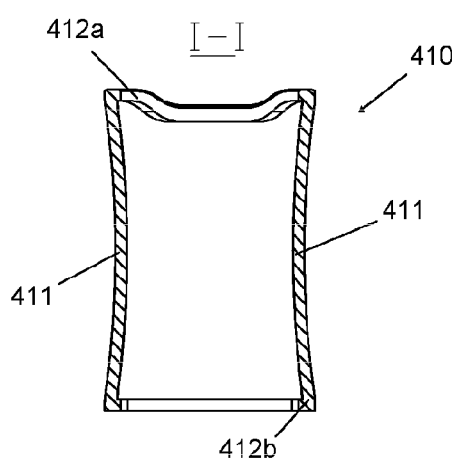
Figure 23D:
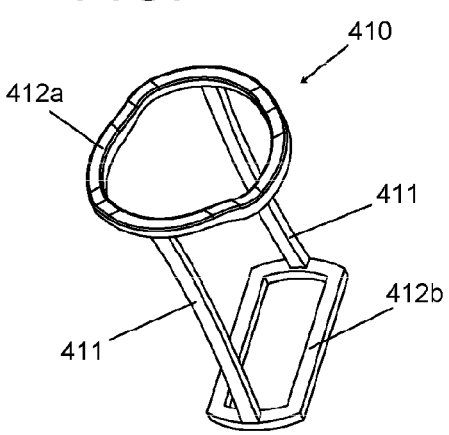
Figure 23E:
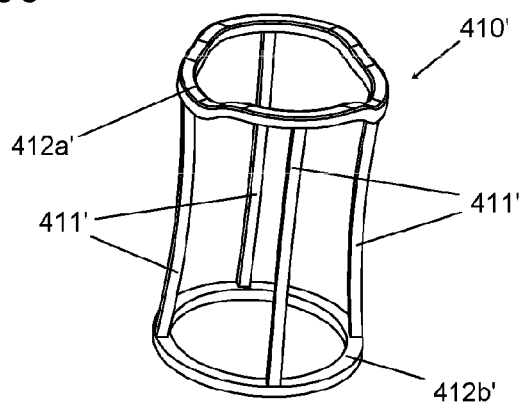
FIG. 23e is a perspective view of a variant of the elastic restoring means shown in FIGS. 23a-d.

FIG. 23e shows a variant of the elastic compressing means of the fourth embodiment. In this variant of the elastic compressing means 410', four elastic strips 411' are comprised which are equally spaced apart around the circumferential direction, and the lower base 412b' is also circular, like the upper base 412a'.

FIG. 24 shows a further variant of the elastic compressing means. In this variant of the elastic compressing means 410", the upper base 412a" and the lower base 412b" are configured the same as the fourth embodiment, except that two elastic strips 411" are arranged in such a way that the elastic deformation thereof in response to the pressing force P is not in the plane passing through the longitudinal axis, i.e. the two elastic strips 411" are respectively deformed in different planes, allowing the two elastic strips 411" to deform in a mutually overlapping manner and to a larger extent, as shown in FIG. 24c. Of course, the two elastic strips 411" are still arranged symmetrically about the longitudinal axis A, such that the line of action of a resultant force of elastic forces generated thereby is always coincident with the longitudinal axis A.

Embodiment 5

Figures 25, 26:
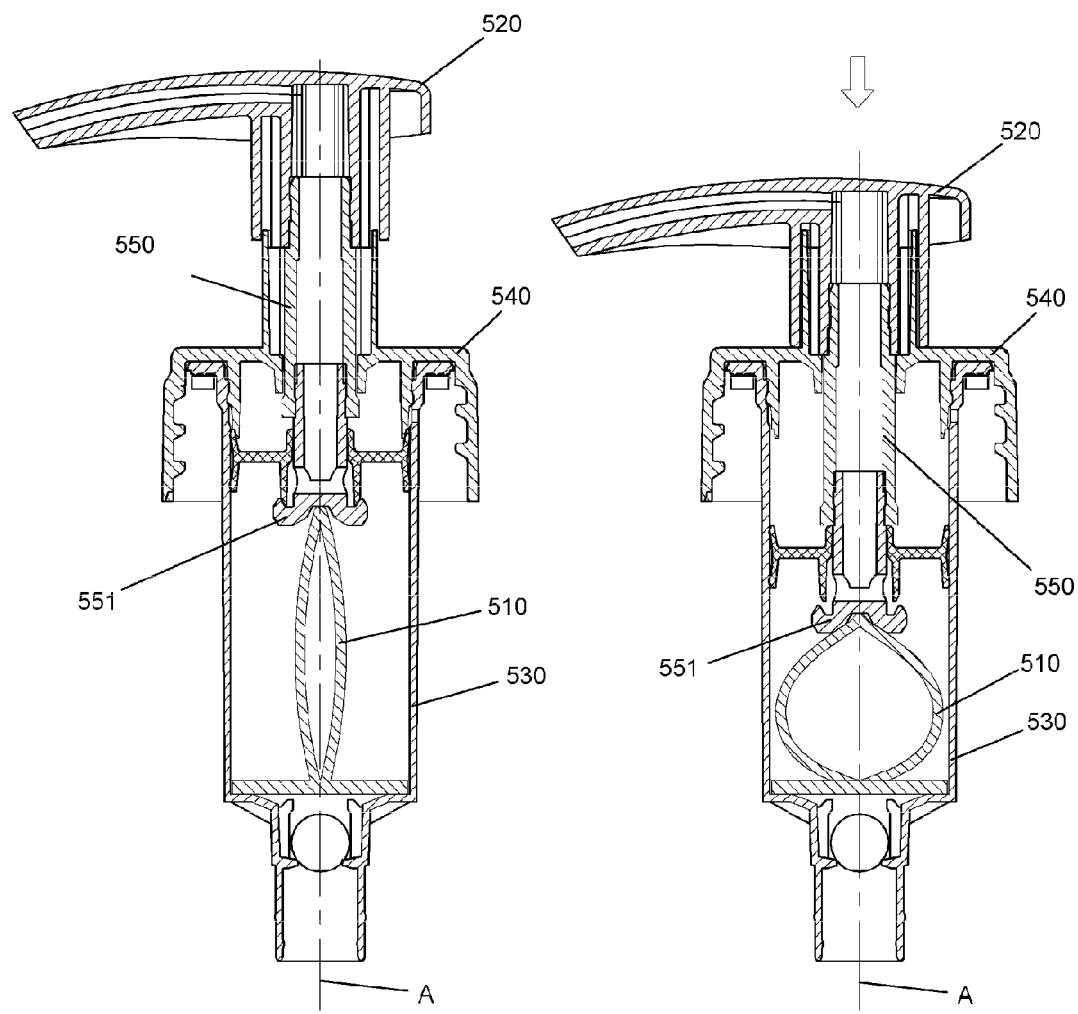
FIG. 25 is a sectional view of a press-type liquid pump according to a fifth embodiment of the present invention in a head locked state.
FIG. 26 is a sectional view of the liquid pump shown in FIG. 25 in a downwardly pressed state.

Reference is made to FIGS. 25-27 below, in which a press-type liquid pump according to a fifth embodiment of the present invention is shown. The general structure of the liquid pump is similar to the fourth embodiment, except that this liquid pump does not have the function of switching the elastic compressing means between the unloaded state and the pre-loaded state, and the structure of the elastic compressing means is different as well.

Specifically, the liquid pump generally comprises an elastic compressing means 510, a pressing head 520, a cylinder 530, a toothed sleeve 540, a piston rod 550 and other components. The piston rod 550 is provided with a piston head 551 which engages with the elastic compressing means 510. Since the liquid pump does not have the function of switching the elastic compressing means between the unloaded state and the pre-loaded state, it is not necessary for the piston rod 550 and the elastic compressing means 510 to have the cam actuation mechanism as in the fourth embodiment.

Moreover, in the present embodiment, the structure of the elastic compressing means is different from the fourth embodiment. As shown in FIGS. 27a-27d, the elastic compressing means 510 comprises two arc-shaped elastic strips 511 which are arranged symmetrically about the longitudinal axis A, the upper ends and lower ends of the two elastic strips are both connected together, and are adapted to deform in one and the same plane which passes through the longitudinal axis A. This configuration makes the line of action of a resultant force of elastic forces generated by the elastic strips 511 always coincident with the longitudinal axis A. Moreover, the lower ends of the two elastic strips 511 are fixed to a base 512. The base 512 comprises a circular ring and a transverse rod extending in a diametrical direction, and the lower ends of the elastic strips 511 are fixed to the transverse rod. In an installed state, the upper ends of the elastic strips 511 of the elastic compressing means 510 that are connected together abut against the lower end of the piston head 551 of the piston rod 550, and the base 512 of the elastic compressing means 510 is borne on a lower circular end face of the cylinder 530. As shown in FIG. 26, when the pressing head 520 is pressed by the user, the piston rod 550 and the pressing head 520, as the movable unit, together move downwardly relative to the toothed sleeve 540 and the cylinder 530 as the fixed unit, and thus the elastic compressing means 510 is subjected to an elastically compressive deformation, thereby applying a restoring force to the piston rod.

Figure 27A:
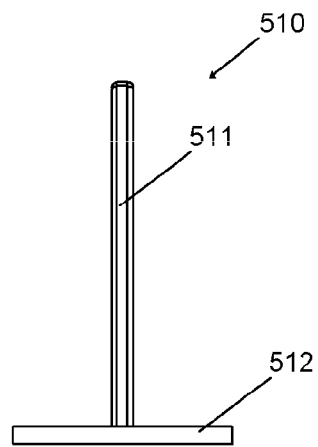
FIGS. 27a-d are various views of an elastic restoring means of the liquid pump shown in FIG. 25.
Figure 27B:
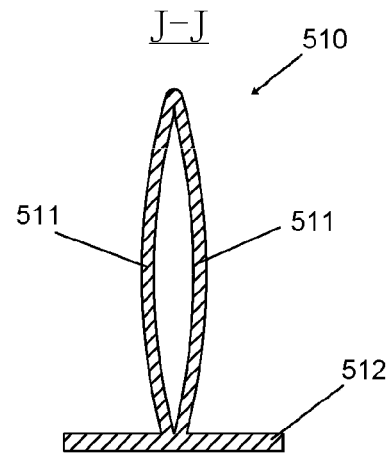
Figure 27C:
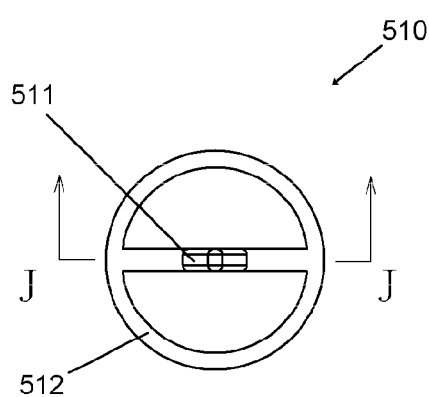
Figure 27D:
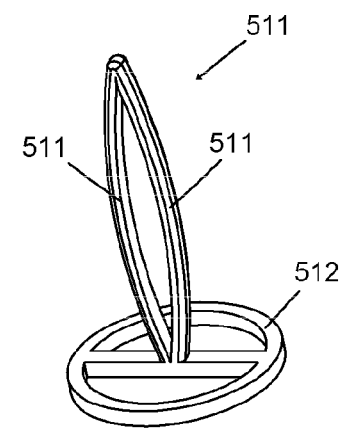
Figure 27E:
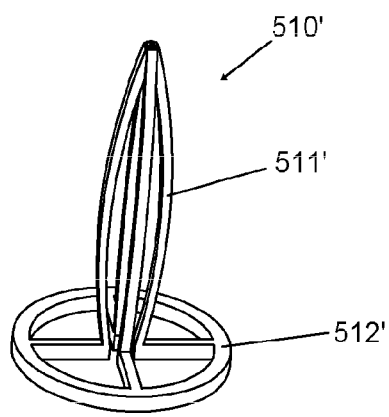
FIGS. 27e-f are various views of a variant of the elastic restoring means shown in FIGS. 27a-d.
Figure 27F:
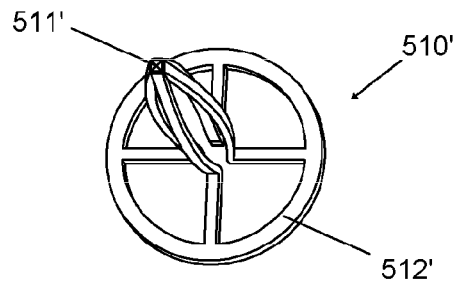
Figure 28:
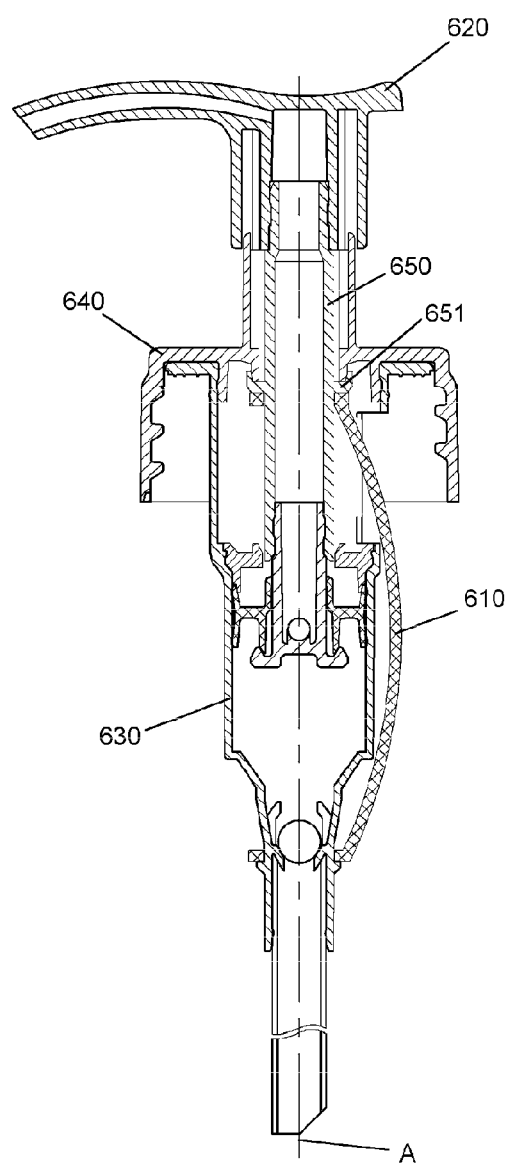
FIG. 28 is a sectional view of a press-type liquid pump according to a sixth embodiment of the present invention in a head locked state.
Figure 29:
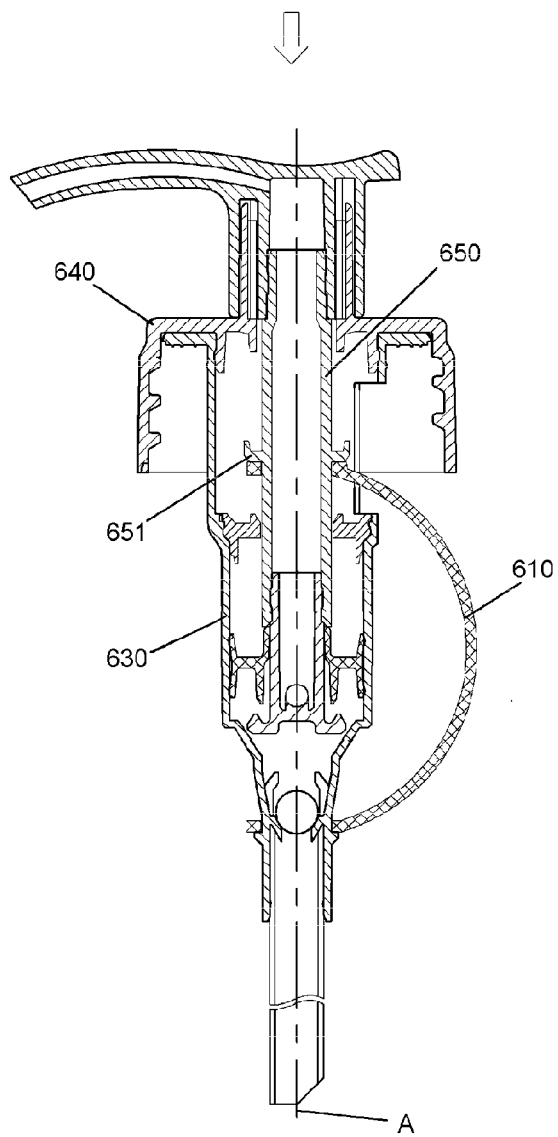
FIG. 29 is a sectional view of the liquid pump shown in FIG. 28 in a downwardly pressed state.
Figure 36A:
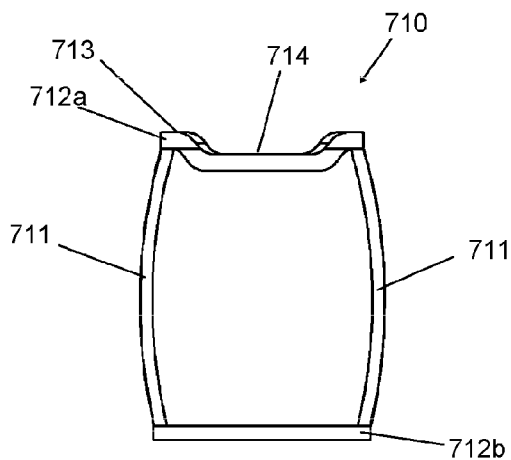
FIG. 36 shows various views of an elastic restoring means of the liquid pump shown in FIG. 33, the elastic restoring means.
Figure 36B:
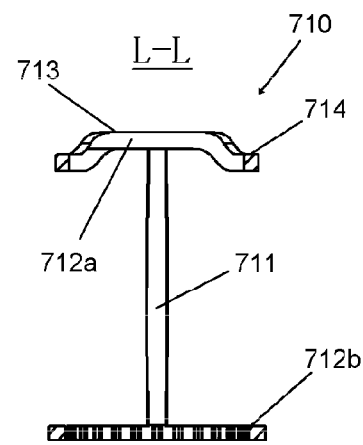
Figure 36C:
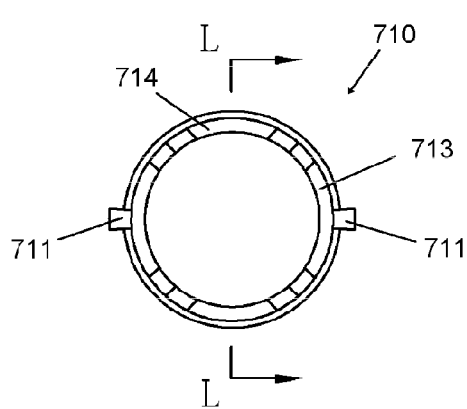
Figure 36D:
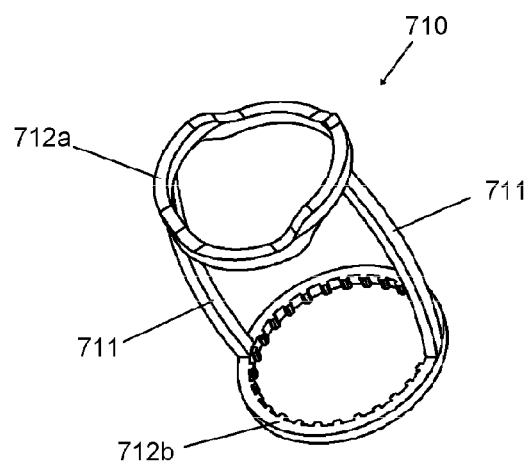
Figure 42:
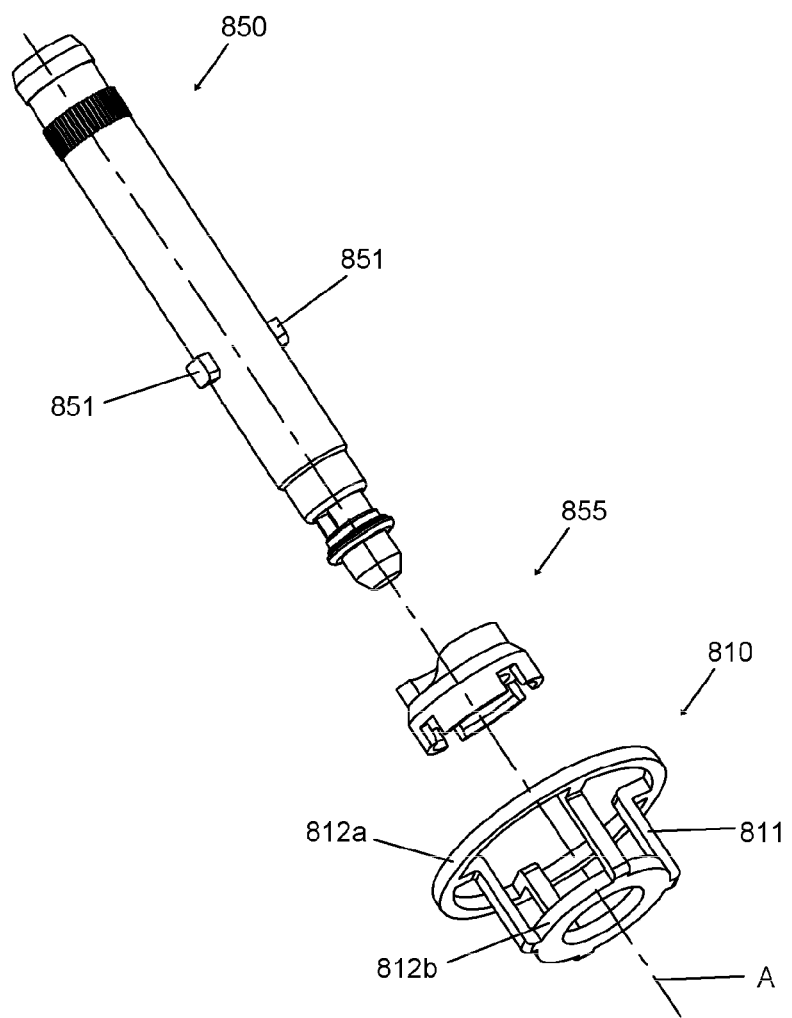
FIG. 42 is a schematic diagram showing the assembling of the piston rod shown in FIG. 37, the elastic tension spring bracket and an elastic tension spring.
Figures 43, 44:
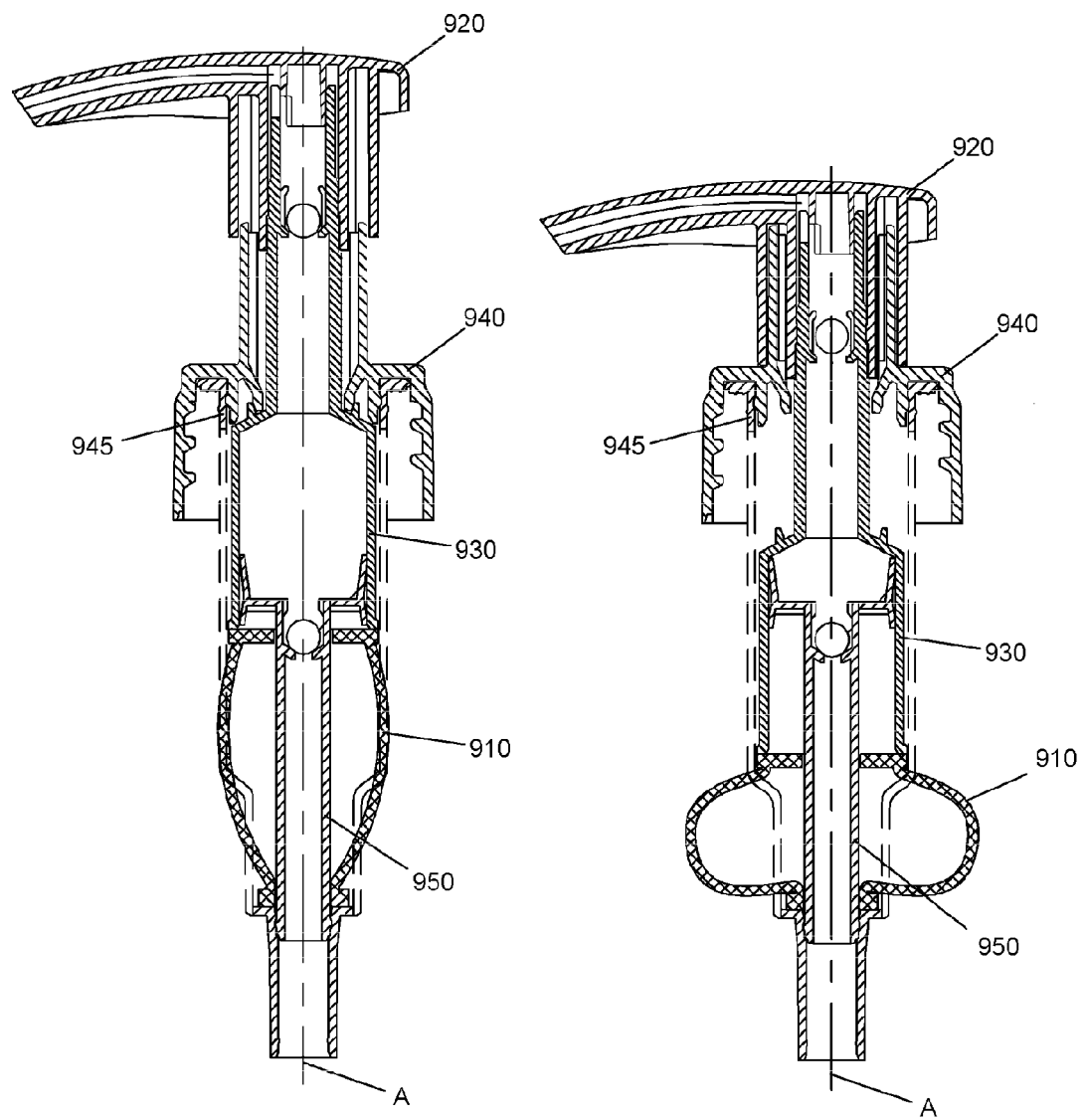
FIG. 43 is a sectional view of a press-type liquid pump according to a ninth embodiment of the present invention in an unpressed state.
FIG. 44 is a sectional view of the liquid pump shown in FIG. 43 in a downwardly pressed state.

FIGS. 27e and 27f show a variant of the elastic compressing means of the fifth embodiment. In this variation, four elastic strips 511' are comprised, the upper ends of these elastic strips are connected together, and the lower end of each of the elastic strips is connected to an annular base 512 via a radially extending transverse rod. Each of the elastic strips 511' is able to deform in one and the same plane which passes through the longitudinal axis A.

Embodiment 6

Reference is made to FIGS. 28-32 below, in which a press-type liquid pump according to a sixth embodiment of the present invention is shown. The general structure of the liquid pump is similar to the second embodiment, except that this liquid pump does not have the function of switching the elastic compressing means between the unloaded state and the pre-loaded state, and the structures of the elastic compressing means and the cylinder are different as well.

Specifically, the liquid pump generally comprises an elastic compressing means 610, a pressing head 620, a cylinder 630, a toothed sleeve 640, a piston rod 650 and other components. Since the liquid pump does not have the function of switching the elastic compressing means between the unloaded state and the pre-loaded state, the piston rod 650 does not have the cam actuation mechanism as in the second embodiment.

Moreover, in the present embodiment, the structure of the elastic compressing means is different from that in the second embodiment. As shown in FIGS. 30a and 30b, the elastic compressing means 610 comprises only one arc-shaped elastic strip 611, which is adapted to deform in one and the same plane which passes through the longitudinal axis A. The upper end and lower end of the elastic strip are respectively connected to an upper and a lower base 612a and 612b in the form of a circular ring. The upper base 612a is sheathed over the piston rod 650 and abuts against a flange 651 formed on the piston rod. The lower base 612b is sheathed over a lower portion of the cylinder 630 and abuts against a tab 634 formed on the outer periphery of the cylinder 630. In the present embodiment, since the upper end and lower end of the elastic strip 611 respectively abut against the piston rod 650 and the cylinder 630 via the bases 612a and 612b in the form of a circular ring, the line of action of an elastic force generated by the single elastic strip is always coincident with the longitudinal axis A.

FIGS. 31a and 31b show a variant of the elastic compressing means, wherein the elastic compressing means 610' comprises an elastic strip 611', and an upper base 612a' and a lower base 612b' which are respectively connected to the upper end and the lower end of the elastic strip. Both the upper base 612a' and the lower base 612b' are formed in an incomplete circular ring shape, i.e. a C shape.

In addition, unlike the second embodiment, the cylinder 630 comprises only one hollow portion 632 for allowing the single elastic strip 611 of the elastic compressing means 610 to pass through from the inside of the cylinder to the outside of the cylinder, as shown in FIG. 32.

Embodiment 7

Reference is made to FIGS. 33-36 below, in which a press-type liquid pump according to a seventh embodiment of the present invention is shown. Like the above-described embodiments, the liquid pump comprises a fixed unit fixed relative to a container and a movable unit capable of performing a reciprocating motion relative to the fixed unit, wherein the fixed unit comprises a toothed sleeve 740 and a cylinder 730 which is fixed below the toothed sleeve, and the movable unit comprises a pressing head 720 and a piston rod 750 fixedly connected to the pressing head.

A plastic elastic compressing means 710 is installed between the pressing head 720 and the toothed sleeve 740, which is used as an elastic restoring means for restoring the movable unit relative to the fixed unit. A movement of the pressing head 720 relative to the toothed sleeve 740 along the longitudinal axis A causes the elastic compressing means to be elastically compressed and deformed, such that the elastic compressing means applies a restoring force to the pressing head so as to restore the movable unit relative to the fixed unit. The elastic compressing means 710 comprises two arc-shaped elastic strips 711 which are arranged symmetrically about the longitudinal axis A, the upper ends of which are connected to an upper base 712a in the form of a ring, the lower ends of which are connected to a lower base 712b in the form of a ring, and which are adapted to deform in one and the same plane which passes through the longitudinal axis A. This configuration makes the line of action of a resultant force of elastic forces generated by the elastic strips 711 always coincident with the longitudinal axis A. An inner periphery of the ring of the lower base 712b is formed with a plurality of teeth, so that the ring prevents the lower base 712b and therefore the entire elastic compressing means 710 from rotating relative to the toothed sleeve 740 when the ring is sheathed over a toothed annular projection 741 which is formed on the upper surface of the toothed sleeve 740.

The upper ends of the elastic strips 711 of the elastic compressing means 710 therefore act on the pressing head 720 and the lower ends act on the toothed sleeve 740, so that a movement of the pressing head 720 relative to the toothed sleeve 740 along the longitudinal axis A causes the elastic strips 711 to be elastically compressed, and the line of action of forces which compress the elastic strips 711 of the elastic compressing means 710 is always collinear with the longitudinal axis A, that is to say, the line of action of a resultant force of elastic forces generated by all the elastic strips 711 is always coincident with the longitudinal axis A.

Each of the elastic strips 711 is generally formed in a radially outwardly concave arc shape, and when uncompressed, a ratio of a length of each of the elastic strips 711 from the upper end to the lower end along the arc shape to a distance thereof in the direction of the longitudinal axis A is within a range greater than 1 and less than $\pi/2$.

The ring of the lower base 712b is formed in a generally circular shape and generally extends in one and the same plane, and the ring of the upper base 712a does not extend in one and the same plane. Specifically, the ring of the upper base 712a has two bearing faces 713 at a higher level and two bearing faces 714 at a lower level in the direction of the longitudinal axis A, and a phase difference between the bearing faces 713 and the bearing faces 714 in the direction of rotation is approximately 90 degrees. Moreover, the higher bearing faces 713 and the lower bearing faces 714 are relatively smoothly connected by a ramp.

When no pressing force is applied to the movable unit (i.e. the pressing head 720 and the piston rod 750), that is to say in the non-use state, the liquid pump is able to switch between a first position in which the elastic compressing means 710 is in an unloaded state and a second position in which the elastic compressing means 710 is in a pre-loaded state. In the embodiment, the switching of the liquid pump between the first position and the second position is realized by means of rotating the pressing head 720 and the piston rod 750 by approximately 90 degrees relative to the toothed sleeve 740 around the longitudinal axis A.

The pressing head 720 is provided with two projections 721 at the lower side, wherein the two projections are arranged to be able to engage with the upper base 712a of the elastic compressing means 710. When the liquid pump is in the first position, i.e. the head locked state, the projections 721 of the pressing head 720 engage with the lower bearing faces 714 of the upper base 712a of the elastic compressing means 710, so as to relax the elastic strips 711 of the elastic compressing means 710, so that the elastic compressing means 710 is in the unloaded state. When the pressing head 720 is rotated relative to the toothed sleeve 740 by 90 degrees to switch the liquid pump from the first position to the second position, the projections 721 of the pressing head 720 engage with the higher bearing faces 713 of the upper base 712a of the elastic compressing means 710, so as to compress the elastic strips 711, so that the elastic compressing means 710 is in the pre-loaded state.

In the embodiment, the upper surface of the elastic compressing means 710 that has the bearing faces 713 and 714 at different levels constitutes a cam face, the cam face and the projections 721 of the pressing head 720 constitute a cam actuation mechanism, and the cam actuation mechanism longitudinally compresses or stretches the elastic compressing means 710 in response to the rotation of the movable unit (the pressing head 720 and the piston rod 750) around the longitudinal axis A relative to the fixed unit (the toothed sleeve 740).

In the second position in which the elastic compressing means 710 is in the pre-loaded state, the pressing head 720 can perform a reciprocating motion under the pressing action applied by the user and the upward restoring action of the elastic compressing means 710, so that the pumping function is achieved.

Embodiment 8

Reference is made to FIGS. 37-42 below, in which a press-type liquid pump according to an eighth embodiment of the present invention is shown. Like the above-described embodiments, the liquid pump comprises a fixed unit fixed relative to a container and a movable unit capable of performing a reciprocating motion relative to the fixed unit, wherein the fixed unit comprises a toothed sleeve 840 and a cylinder 830 which is fixed below the toothed sleeve, and the movable unit comprises a pressing head 820 and a piston rod 850 fixedly connected to the pressing head.

An elastic restoring means is installed between the cylinder 830 and the piston rod 850, for restoring the movable unit relative to the fixed unit after the user has removed the pressing action. Unlike the embodiments described above, the elastic restoring means of the present embodiment is an elastic stretching means 810. A movement of the pressing head 820 and the piston rod 850 relative to the toothed sleeve 840 and the cylinder 830 along the longitudinal axis A causes the elastic compressing means to be elastically stretched and deformed, such that the elastic stretching means 810 applies a restoring force to the pressing head 820 and the piston head 850 so as to restore the movable unit relative to the fixed unit.

The elastic stretching means 810 comprises four elastic strips 811 which are equally spaced apart around the longitudinal axis A, the upper ends of which are connected to an upper base 812a in the form of a ring, and the lower ends of which are connected to a lower base 812b in the form of a ring. The upper base 812a is fixed to an upper end part of the cylinder 830 (such as a cylinder plug), and the lower base 812b is connected to the piston rod 850 via a bracket 855. This configuration makes the line of action of a resultant force of elastic forces generated by the elastic strips 811 always coincident with the longitudinal axis A.

The bracket 855 is formed in a generally tubular shape and is sheathed over the piston rod 850. The lower end of the bracket 855 engages with the lower base 812b of the elastic stretching means 810, and the upper end thereof engages with a pair of protruding blocks 851 which are formed on the piston rod 850. The pair of protruding blocks 851 protrudes out of the outer circumference of the piston rod 850 in a diametrical direction. As shown in FIG. 41, the upper end of the bracket 855 has two bearing faces 856 at a higher level and two bearing faces 857 at a lower level in the direction of the longitudinal axis A, and a phase difference between the bearing faces 856 and the bearing faces 857 in the direction of rotation is approximately 90 degrees. Moreover, the higher bearing faces 856 and the lower bearing faces 857 are relatively smoothly connected by a ramp.

When no pressing force is applied to the movable unit (i.e. the pressing head 820 and the piston rod 850), that is to say in the non-use state, the liquid pump is able to switch between a first position in which the elastic stretching means 810 is in an unloaded state and has a length of H and a second position in which the elastic stretching means 810 is in a pre-loaded state and has a length of H1. In the embodiment, the switching of the liquid pump between the first position and the second position is realized by means of rotating the pressing head 820 and the piston rod 850 by approximately 90 degrees around the longitudinal axis A relative to the toothed sleeve 840 and the cylinder 830.

When the liquid pump is in the first position, i.e. the head locked state, the protruding blocks 851 of the piston rod 850 engage with the lower bearing faces 857 of the upper end of the bracket 855, so as to relax the elastic strips 811 of the elastic stretching means 810, so that the elastic stretching means 810 is in the unloaded state. When the pressing head 820 is rotated by 90 degrees relative to the toothed sleeve 840 to switch the liquid pump from the first position to the second position, the protruding blocks 851 of the piston rod 850 engage with the higher bearing faces 856 of the bracket 855, so as to stretch the elastic strips 811, so that the elastic stretching means 810 is in the pre-loaded state.

In the embodiment, the bracket 855 of the elastic stretching means 810 that has the bearing faces 856 and 857 at different levels and the protruding blocks 851 of the piston rod 850 constitute a cam actuation mechanism, and the cam actuation mechanism longitudinally compresses or stretches the elastic stretching means 810 in response to the rotation of the movable unit (the pressing head 820 and the piston rod 850) around the longitudinal axis A relative to the fixed unit (the toothed sleeve 840 and the cylinder 830).

In the second position in which the elastic stretching means 810 is in the pre-loaded state, the pressing head 820 can perform a reciprocating motion under the pressing action applied by the user and the upward restoring action of the elastic stretching means 810, so that the pumping function is achieved. When the pressing head 820 is downwardly pressed to reach a lower stop position of a pressing stroke, as shown in FIG. 39, the length of the elastic stretching means 810 reaches the maximum of H2, and at this point the elastic restoring force applied thereby has reached the maximum.

Embodiment 9

Reference is made to FIGS. 43-46 below, in which a press-type liquid pump according to a ninth embodiment of the present invention is shown. Like the above-described embodiment, the liquid pump comprises a fixed unit fixed relative to a container and a movable unit capable of performing a reciprocating motion relative to the fixed unit, wherein the fixed unit comprises a toothed sleeve 940 and a piston rod 950 which is fixed to the toothed sleeve via a piston rod bracket 945, and the movable unit comprises a pressing head 920 and a cylinder 930 which is fixedly connected to the pressing head.

Figure 45:
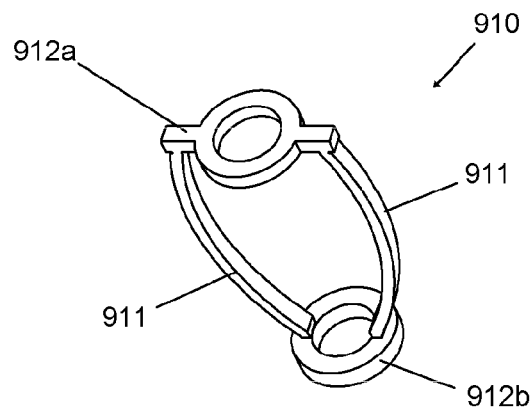
FIG. 45 is a perspective view of an elastic restoring means of the liquid pump shown in FIG. 43.
Figure 46:
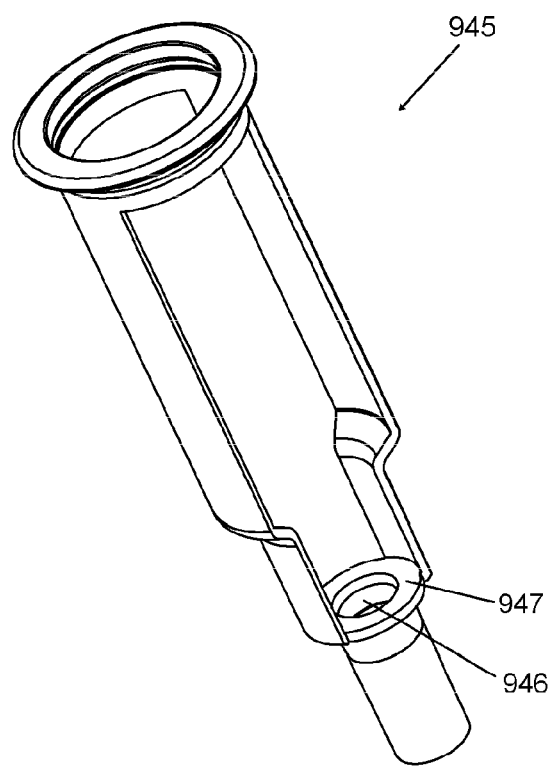
FIG. 46 is a perspective view of a cylinder bracket of the liquid pump shown in FIG. 43.

An elastic compressing means made of plastic is installed between the cylinder 930 and the piston rod 950 below the toothed sleeve 940, for restoring the movable unit relative to the fixed unit after the user has removed the pressing action. The elastic compressing means 910 comprises two elastic strips 911 arranged symmetrically about the longitudinal axis A, the upper ends of the two elastic strips 911 are connected together by an upper base 912a in the form of a ring, and the lower ends thereof are connected together by a lower base 412b in the form of a ring, as shown in FIG. 45. This configuration makes the line of action of a resultant force of elastic forces generated by the elastic strips 911 always coincident with the longitudinal axis A. Preferably, each of the elastic strips 911 is generally formed in a radially outwardly concave arc shape, and when uncompressed, a ratio of a length of each of the elastic strips 911 from the upper end to the lower end along the arc shape to a distance thereof in the direction of the longitudinal axis A is within a range greater than 1 and less than $\pi/2$. In the embodiment, the two elastic strips 911 are deformed in one and the same plane which passes through the longitudinal axis A.

In an installed state, the upper end of the elastic compressing means 910 acts on the cylinder 950 and the lower end acts on the cylinder 930, such that a movement of the cylinder 930 relative to the piston rod 950 along the longitudinal axis A causes the elastic strips 911 of the elastic compressing means 910 to be elastically compressed and deformed, so as to provide an elastic restoring force for the liquid pump.

The upper end of the piston rod bracket 945 and the toothed sleeve 940 are fixed together, and the lower end is provided with a bore 946 for fixedly installing the piston rod 950, such that the piston rod 950 is fixedly installed in the bore 946 to keep it fixed relative to the toothed sleeve 940. A bearing land 947 is formed around the bore 946 for bearing the lower end of the elastic compressing means 910 (i.e. the lower base 912b). The rings of the upper base 912a and the lower base 912b of the elastic compressing means 910 are sheathed over the piston rod 950. The upper base 912a of the elastic compressing means 910 abuts against the lower end of the cylinder 930.

Figure 47:
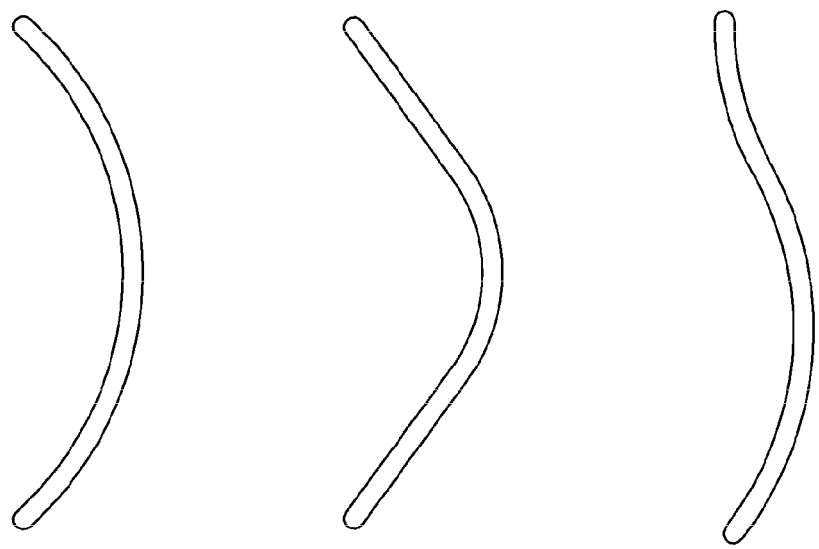
FIG. 47 shows various elevation shapes of an elastic strip usable for the elastic restoring means of the present invention.
Figure 48:
FIG. 48 shows different sectional shapes of an elastic strip usable for the elastic restoring means of the present invention.
Figure 49:
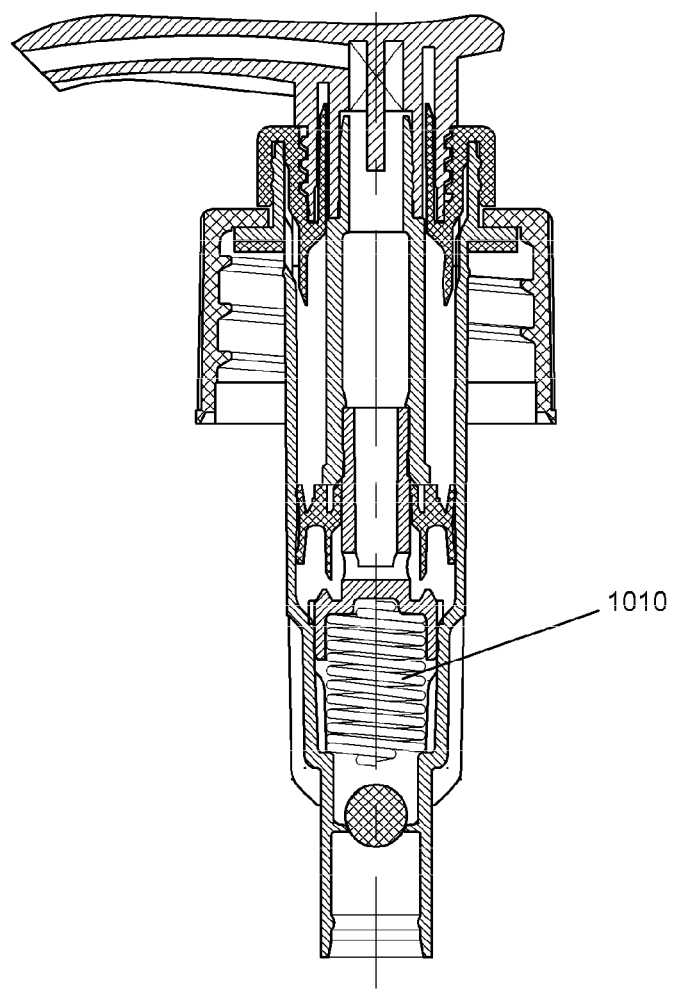
FIG. 49 is a sectional view of a prior art press-type liquid pump.
Figure 50:
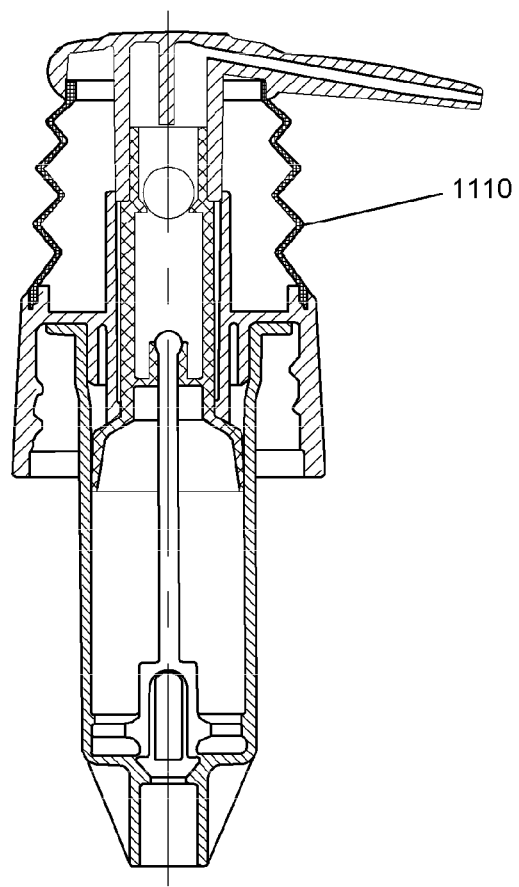
FIG. 50 is a sectional view of another prior art press-type liquid pump.
Figure 51:
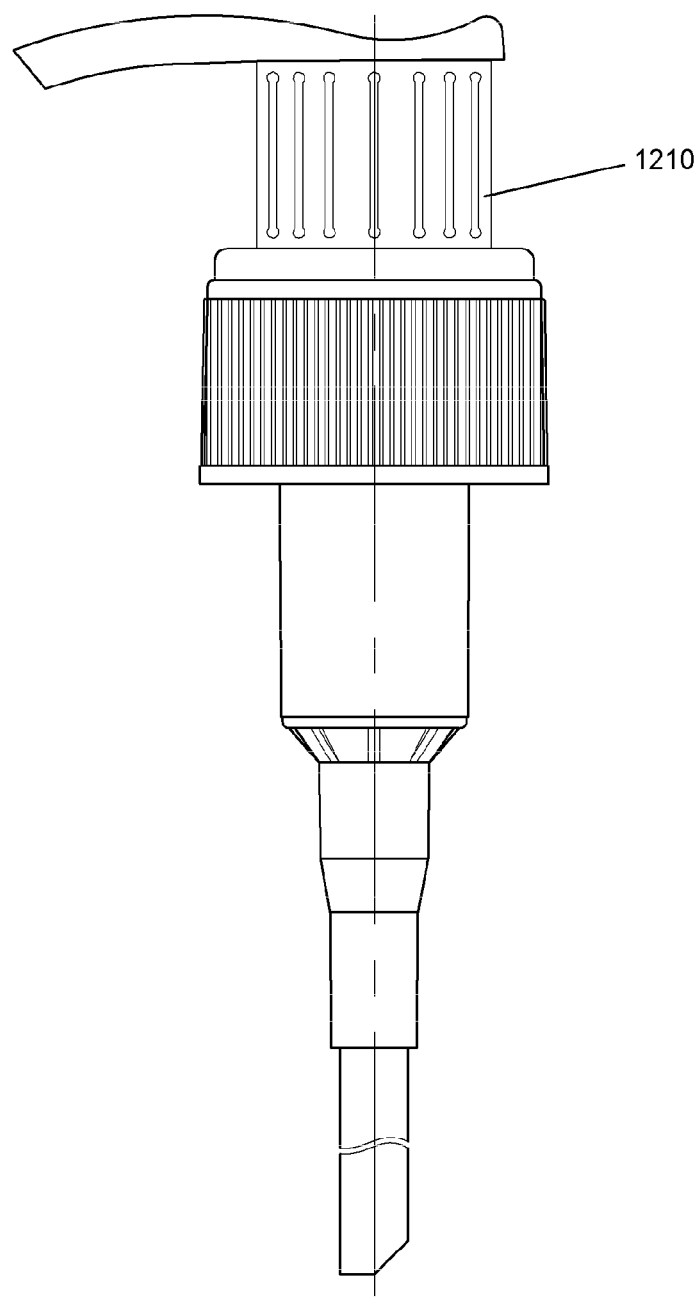
FIG. 51 is a sectional view of yet another prior art press-type liquid pump.

FIG. 47 shows several examples of elevation shapes of an elastic strip usable for the elastic restoring means of the present invention, and FIG. 48 shows several examples of sectional shapes of an elastic strip usable for the elastic restoring means of the present invention. Of course, many other shapes are possible.

The present invention has been described above by means of the description of the exemplary embodiments; however, it will be apparent to a person skilled in the art that various changes can be made to the illustrated embodiments within the spirit and scope of the present invention. As an example, in many illustrated embodiments, the cam actuation mechanism for switching the elastic restoring means between the unloaded and pre-loaded state as one aspect of the present invention and the configuration of the elastic compressing means as another aspect of the present invention are implemented simultaneously, but they can be separately implemented in different embodiments. As a further example, in illustrated embodiments regarding switching the elastic restoring means between the unloaded and pre-loaded states of the present invention, the switching of the liquid pump between first and second positions is achieved by means of rotating the movable unit relative to the fixing unit around the longitudinal axis, but it can also be achieved in another way (for example, using a separate mechanism similar to the mechanism used in a telescopic ballpoint pen), as long as the compressing and stretching of the elastic restoring means can be achieved thereby. As a yet further example, in the eighth embodiment, the cam face constituting the cam actuation mechanism is formed on the bracket 855, but the cam face may also be formed on the piston rod 850. As a still further example, in most of the illustrated embodiments, the number of elastic strips is selected as an even number (such as two, four), but it is also feasible for the number of elastic strips to be selected as an odd number (such as three, five); it will be appreciated that both an even number and an odd number of elastic strips can be configured such that the line of action of a resultant force of the elastic forces generated thereby is coincident with the longitudinal axis of the liquid pump. Accordingly, the protective scope of the present invention is not limited to the particular embodiments described herein, and should be defined, rationally, by the claims.

The invention claimed is:

1. A press-type liquid pump for fitting to a container to pump a liquid product within the container to an exterior of the container, the liquid pump defining a longitudinal axis and comprising:
    a fixed unit fixed relative to the container, the fixed unit including a toothed sleeve for fixing the liquid pump to the container and a cylinder which is located below and fixedly connected to the toothed sleeve; and
    a movable unit capable of performing a reciprocating motion relative to the fixed unit, the liquid product being pumped to the exterior of the container by means of the reciprocating motion, the reciprocating motion being achieved by a pressing force applied by a user to the movable unit to move the movable unit relative to the fixed unit along the longitudinal axis of the liquid pump in combination with an elastic force of an elastic restoring means for restoring the movable unit relative to the fixed unit along the longitudinal axis after the pressing force is removed, the movable unit comprising a pressing head which is positioned above the toothed sleeve for the user to press and a piston rod which is positioned below and fixedly connected to the pressing head,
    the elastic restoring means being a plastic elastic compressing means which is located below the toothed sleeve and installed between the piston rod and the cylinder, the plastic elastic compressing means comprising at least one elastic strip generally formed in an arc shape, an upper end of the elastic strip acting on the piston rod and a lower end of the elastic strip acting on the cylinder, such that a movement of the piston rod relative to the cylinder along the longitudinal axis causes the elastic strip to be elastically compressed, and a line of action of a resultant force of elastic forces generated by the elastic strip is always coincident with the longitudinal axis.

2. The liquid pump as claimed in claim 1, wherein the elastic strip is deformed in one and the same plane which passes through the longitudinal axis.

3. The liquid pump as claimed in claim 1, wherein the elastic strip is deformed in one and the same plane which does not pass through the longitudinal axis.

4. The liquid pump as claimed in claim 1, at least one of the upper end and the lower end of the elastic strip is connected together by a base.

5. The liquid pump as claimed in claim 4, wherein the base is in the form of a circular ring.

6. The liquid pump as claimed in claim 4, wherein, without the pressing force applied to the pressing head, the liquid pump is able to switch between a first position in which the plastic elastic compressing means is in an unloaded state and a second position in which the plastic elastic compressing means is in a pre-loaded state, by means of rotation of the piston rod around the longitudinal axis.

7. The liquid pump as claimed in claim 1, wherein the lower end of the plastic elastic compressing means acts on an upper portion of the cylinder.

8. The liquid pump as claimed in claim 1, wherein the lower end of the plastic elastic compressing means acts on a lower portion of the cylinder.

9. The liquid pump as claimed in claim 1, wherein, when uncompressed, a ratio of a length of the elastic strip from the upper end to the lower end along the arc shape to a distance thereof in the direction of the longitudinal axis is within a range greater than 1 and less than $\pi/2$.

10. A press-type liquid pump for fitting to a container to pump a liquid product within the container to an exterior of the container, the liquid pump defining a longitudinal axis and comprising:
    a fixed unit fixed relative to the container, the fixed unit including a toothed sleeve for fixing the liquid pump to the container; and
    a movable unit capable of performing a reciprocating motion relative to the fixed unit, the liquid product being pumped to the exterior of the container by means of the reciprocating motion, the reciprocating motion being achieved by a pressing force applied by a user to the movable unit to move the movable unit relative to the fixed unit along the longitudinal axis of the liquid pump in combination with an elastic force of an elastic restoring means for restoring the movable unit relative to the fixed unit along the longitudinal axis after the pressing force is removed, the movable unit comprising a pressing head which is positioned above the toothed sleeve for a user to press,
    the elastic restoring means being a plastic elastic compressing means which is installed between the pressing head and the toothed sleeve, the plastic elastic compressing means comprising at least two elastic strips which are arranged around the longitudinal axis, an upper end of each of the elastic strips acting on the pressing head while a lower end of each of the elastic strips is connected to the toothed sleeve, such that a movement of the pressing head relative to the toothed sleeve along the longitudinal axis causes the elastic strips to be elastically compressed, and a line of action of a resultant force of elastic forces generated by the elastic strips is always coincident with the longitudinal axis, each of the elastic strips being generally formed in an arc shape, and when uncompressed, a ratio of a length of each of the elastic strips from the upper end to the lower end along the arc shape to a distance thereof in the direction of the longitudinal axis is within a range greater than 1 and less than $\pi/2$.

11. The liquid pump as claimed in claim 10, wherein each of the elastic strips is deformed in one and the same plane which passes through the longitudinal axis.

12. The liquid pump as claimed in claim 10 wherein each of the elastic strips is deformed in one and the same plane which does not pass through the longitudinal axis.

13. The liquid pump as claimed in claim 10, wherein at least one of the upper end and the lower end of the elastic strips is connected together by a base.

14. The liquid pump as claimed in claim 10, wherein the base is in the form of a ring.

15. The liquid pump as claimed in claim 10, wherein, without the pressing force applied to the pressing head, the liquid pump is able to switch between a first position in which the plastic elastic compressing means is in an unloaded state and a second position in which the plastic elastic compressing means is in a pre-loaded state, by means of rotation of the pressing head relative to the toothed sleeve around the longitudinal axis.

16. The liquid pump as claimed in claim 15, wherein the upper ends of the elastic strips are connected together by a ring, the ring comprising two bearing faces at different levels in the direction of the longitudinal axis, a phase difference between the two bearing faces in the direction of rotation being approximately 90 degrees, the pressing head being provided at a lower side thereof with a projection for cooperating with the bearing faces, so as to compress or stretch the plastic elastic compressing means by means of rotation of the pressing head relative to the toothed sleeve.

17. A press-type liquid pump for fitting to a container to pump a liquid product within the container to an exterior of the container, the liquid pump defining a longitudinal axis and comprising:

a fixed unit fixed relative to the container and including a toothed sleeve for fixing the liquid pump to the container and a piston rod fixed relative to the toothed sleeve; and a movable unit capable of performing a reciprocating motion relative to the fixed unit, the liquid product being pumped to the exterior of the container by means of the reciprocating motion, the reciprocating motion being achieved by a pressing force applied by a user to the movable unit to move the movable unit relative to the fixed unit along a longitudinal axis of the liquid pump in combination with an elastic force of an elastic restoring means for restoring the movable unit relative to the fixed unit along the longitudinal axis after the pressing force is removed, the movable unit comprising a pressing head which is positioned above the toothed sleeve for a user to press and a cylinder which is fixedly connected to the pressing head, the elastic restoring means being a plastic elastic compressing means which is located below the toothed sleeve and installed between the cylinder and the piston rod, the plastic elastic compressing means comprising at least one elastic strip generally formed in an arc shape, an upper end of the elastic strip acts on the cylinder and a lower end of the elastic strip acts on the piston rod, such that a movement of the cylinder relative to the piston rod along the longitudinal axis causes the elastic strip to be elastically compressed, and a line of action of a resultant force of elastic forces generated by the elastic strip is always coincident with the longitudinal axis.

18. The liquid pump as claimed in claim 17, wherein each of the at least one elastic strip is deformed in one and the same plane which passes through the longitudinal axis.

19. The liquid pump as claimed in claim 17, wherein each of the at least one elastic strip is deformed in one and the same plane which does not pass through the longitudinal axis.

20. The liquid pump as claimed in claim 17, wherein at least one of the upper end and the lower end of the at least one elastic strip is connected together by a base.

21. The liquid pump as claimed in claim 20, wherein the base is in the form of a ring.

* * * * *